(12) United States Patent
Fujishima et al.

(10) Patent No.: US 6,293,583 B1
(45) Date of Patent: Sep. 25, 2001

(54) APPARATUS FOR ACTIVATING PASSIVE SAFETY DEVICE

(75) Inventors: Hiromichi Fujishima, Toyota; Takao Akatsuka, Aichi-gun, both of (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 09/079,055

(22) Filed: May 14, 1998

(30) Foreign Application Priority Data

May 15, 1997 (JP) .................................... 9-125936
Jan. 19, 1998 (JP) ................................. 10-007524

(51) Int. Cl.⁷ .................................................. B60R 21/32
(52) U.S. Cl. ...................... 280/735; 280/728.1; 280/734
(58) Field of Search .................................. 280/735, 734, 280/728.1; 701/45

(56) References Cited

FOREIGN PATENT DOCUMENTS 880801A    3/1996  (JP) .

*Primary Examiner*—Eric Culbreth
(74) *Attorney, Agent, or Firm*—Kenyon & Kenyon

(57) ABSTRACT

An activating apparatus of passive safety device having squibs, each for activating a passive safety device for protecting a passenger, current controllers for controlling an electric current supplied from an on-vehicle power supply to the squibs in the event of a crash and for controlling an electric current supplied from an off-vehicle power supply that is connected at the time of disposal of the passive safety devices, to the squibs, and a driver for outputting a driving signal to the current controllers to supply the electric current from the on-vehicle power supply or the off-vehicle power supply to the squibs, thereby activating the passive safety devices. The driver disables outputting of the driving signal based on the crash to the current controllers at the time of disposal of the passive safety devices.

23 Claims, 15 Drawing Sheets

APPARATUS FOR ACTIVATING PASSIVE SAFETY DEVICE

BACKGROUND OF THE INVENTION

1. Field of the Invention

The present invention relates to an activating apparatus of passive safety device for forcedly activating a passive safety device at the time of disposal of the passive safety device provided for protecting a passenger inside a vehicle.

2. Related Background Art

In recent years, vehicles are equipped with various passive safety devices, including not only an air bag device for driver seat, an air bag device for passenger seat, and side air bag devices, but also seat belts with a pretensioner. When a vehicle equipped with such passive safety devices is scrapped, the passive safety devices become no longer necessary and it is desired that the scrapping of vehicle be done after the passive safety devices have been activated in a forced manner.

A conventional method for forcedly activating a passive safety device such as an air bag device preliminarily before scrapping of the vehicle was a method for providing a line for supplying an electric current from an off-vehicle power supply or the like to a squib while bypassing a safing sensor the of air bag device and for actually supplying the current to the squib to forcedly activate the air bag device, thus effecting disposal thereof. Another conventional disposing method of air bag device is, for example, the one disclosed in Japanese Laid-open Patent Application No. Hei 8-80801.

SUMMARY OF THE INVENTION

The conventional disposing methods of the air bag device described above, however, had the problem in the disposal by activation of the air bag device that when an on-vehicle power supply was connected, the current was sometimes supplied from the on-vehicle power supply to the squib, whereby the disposal of the air bag device was not done with accuracy.

An object of the present invention is to provide an activating apparatus of a passive safety device that can activate a plurality of passive safety devices mounted on a vehicle with accuracy in the disposal thereof.

An activating apparatus of a passive safety device according to the present invention is an activating apparatus of passive safety device comprising: a squib for activating a passive safety device for protecting a passenger; current controlling means for controlling an electric current supplied from an on-vehicle power supply to the squib in the event of a crash of a vehicle and for controlling an electric current supplied from an off-vehicle power supply connected at the time of disposal of the passive safety device to the squib; and driving means for outputting a driving signal to the current controlling means so as to supply an electric current from the on-vehicle power supply or the off-vehicle power supply to the squib, thereby activating the passive safety device; wherein the driving means disables outputting of a driving signal based on the crash of the vehicle to the current controlling means at the time of disposal of the passive safety device.

Since this activating apparatus of the passive safety device is arranged so that at the time of disposal of the passive safety device the driving means disables outputting of the driving signal based on the crash to the current controlling means, the current is not supplied from the on-vehicle power supply to the squib but the current is supplied from only the off-vehicle power supply to the squib, whereby the disposal of the passive safety device can be performed with accuracy.

This activating apparatus of a passive safety device is characterized in that the driving means makes determination that the disposal of the passive safety device is under way, if a voltage of the off-vehicle power supply connected at the time of disposal of the passive safety device is not less than a predetermined voltage value.

Since the activating apparatus of a passive safety device is arranged so that the apparatus is determined to be in the disposal of the passive safety device when the voltage of the off-vehicle power supply is not less than the predetermined voltage value, the determination of whether the disposal of the passive safety device is under way can be made with accuracy.

This activating apparatus of the passive safety device is characterized in that the driving means makes determination that the disposal of the passive safety device is under way, if a voltage of the off-vehicle power supply connected at the time of disposal of the passive safety device is not less than a predetermined voltage value and if a voltage of the on-vehicle power supply is not more than a predetermined voltage value.

Since this activating apparatus of the passive safety device is arranged so that the determination is made that the apparatus is in the disposal of passive safety device when the voltage of the off-vehicle power supply is not less than the predetermined voltage value and when the voltage of the on-vehicle power supply is not more than the predetermined voltage value, the determination of whether the disposal of the passive safety device is under way can be made surely.

Another activating apparatus of the passive safety device according to the present invention is an activating apparatus of the passive safety device comprising: a squib for activating a passive safety device for protecting a passenger; current controlling means for controlling an electric current supplied from an on-vehicle power supply to the squib in the event of a crash of a vehicle and for controlling an electric current supplied from an off-vehicle power supply connected at the time of disposal of the passive safety device to the squib; and driving means for outputting a driving signal to the current controllig means so as to supply an electric current from the on-vehicle power supply or the off-vehicle power supply to the squib, thereby activating the passive safety device; wherein the driving means disables outputting of a driving signal based on the disposal of the passive safety device to the current controlling means during normal operation.

Since this activating apparatus of passive safety device is arranged so that during the normal operation the driving means disables outputting of the driving signal based on the disposal of the passive safety device to the current controlling means, the current is not supplied from the off-vehicle power supply to the squib but the current is supplied from only the on-vehicle power supply to the squib, whereby the operation of the passive safety device can be performed with accuracy.

This activating apparatus of the passive safety device is characterized in that the driving means makes determination that the normal operation is under way, if a voltage of the off-vehicle power supply connected at the time of disposal of the passive safety device is not more than a predetermined voltage value.

Since this activating apparatus of the passive safety device is arranged so that the determination is made that the apparatus is in the normal operation when the voltage of the off-vehicle power supply is not more than the predetermined voltage value, the determination of whether the normal operation is under way can be made with accuracy.

This activating apparatus of the passive safety device is characterized in that the driving means makes determination that the normal operation is under way, if a voltage of the off-vehicle power supply connected at the time of disposal of the passive safety device is not more than a predetermined voltage value and if a voltage of the on-vehicle power supply is not less than a predetermined voltage value.

Since this activating apparatus of the passive safety device is arranged so that the determination is made that the apparatus is in the normal operation when the voltage of the off-vehicle power supply is not more than the predetermined voltage value and when the voltage of the on-vehicle power supply is not less than the predetermined voltage value, the determination of whether the normal operation is under way can be made surely.

Another activating apparatus of a passive safety device according to the present invention is an activating apparatus of the passive safety device comprising: a squib for activating a passive safety device for protecting a passenger; current controlling means for controlling an electric current supplied film an on-vehicle power supply to the squib in the event of a crash of a vehicle and for controlling an electric current supplied from an off-vehicle power supply connected at the time of disposal of the passive safety device to the squib; and driving means for outputting a driving signal to the current controlling means so as to supply an electric current from the on-vehicle power supply or the off-vehicle power supply to the squib, thereby activating the passive safety device; wherein before the driving means outputs the driving signal to the current controlling means at the time of disposal of the passive safety device, a diagnosis of the driving means is carried out.

Since this activating apparatus of the passive safety device is arranged so that the diagnosis of the driving means is carried out before the driving means outputs the driving signal to the current controlling means at the time of disposal of the passive safety device, the driving signal can be outputted surely to the current controlling means.

This activating apparatus of the passive safety device is characterized in that when the driving means outputs the driving signal to the current controlling means at the time of of the passive safety device, a diagnosis of operation of the current controlling means is disabled.

Since this activating apparatus of the passive safety device is arranged so that the diagnosis of the operation of the current controlling means is disabled when the driving means outputs the driving signal to the current controlling means at the time of disposal of the passive safety device, the current is supplied from the off-vehicle power supply to the squib only when the driving signal is outputted; whereby the current is prevented from being supplied from the off-vehicle power supply to the squib during the diagnosis of the driving means.

This activating apparatus of the passive safety device is characterized in that the driving means makes determination that the disposal of the passive safety device is under way, if a voltage of the off-vehicle power supply connected at the time of disposal of the passive safety device is not less than a predetermined voltage value.

Since this activating apparatus of the passive safety device is arranged so that the determination is made that the apparatus is in the disposal of the passive safety device when the voltage of the off-vehicle power supply is not less than the predetermined voltage value, the determination of whether the disposal of the passive safety device is under way can be made with accuracy; when the determination is made that the disposal of passive safety device is under way, the current is supplied from the off-vehicle power supply to the squib only when the driving signal is outputted; whereby the current can be prevented from being supplied from the off-vehicle power supply to the squib during the diagnosis of the driving means.

This activating apparatus of the passive safety device is characterized in that the driving means makes determination that the disposal of the passive safety device is under way, if a voltage of the on-vehicle power supply is not more than a predetermined voltage value.

Since this activating apparatus of passive safety device is arranged so that the determination is made that the apparatus is in the disposal of the passive safety device when the voltage of the on-vehicle power supply is not more than the predetermined voltage value, the determination of whether the disposal of the passive safety device is under way can be made with accuracy; when the determination is made that the disposal of the passive safety device is under way, the current is supplied from the off-vehicle power supply to the squib only when the driving signal is outputted; whereby the current can be prevented from being supplied from the off-vehicle power supply to the squib during the diagnosis of the driving means.

This activating apparatus of the passive safety device is characterized in that the driving means makes determination that the disposal of the passive safety device is under way, if a voltage of the off-vehicle power supply connected at the time of disposal of the passive safety device is not less than a predetermined voltage value and if a voltage of the on-vehicle power supply is not more than a predetermined voltage value.

Since this activating apparatus of the passive safety device is arranged so that the determination is made that the apparatus is in the disposal of the passive safety device when the voltage of the off-vehicle power supply is not less than the predetermined voltage value and when the voltage of the on-vehicle power supply is not more than the predetermined voltage value, the determination of whether the disposal of the passive safety device is under way can be made surely; when the determination is made that the disposal of the passive safety device is under way, the current is supplied from the off-vehicle power supply to the squib only when the driving signal is outputted; whereby the current can be prevented from being supplied from the off-vehicle power supply to the squib during the diagnosis of the driving means.

Another activating apparatus of a passive safety device according to the present invention is an activating apparatus of a passive safety device comprising: a squib for activating a passive safety device for protecting a passenger; current controlling means for controlling an electric current supplied from an on-vehicle power supply to the squib in the event of a crash of a vehicle and for controlling an electric current supplied from an off-vehicle power supply connected at the time of disposal of the passive safety device to the squib; and driving means for outputting a driving signal to the current controlling means so as to supply an electric current from the on-vehicle power supply or the off-vehicle power supply to the squib, thereby activating the passive safety device; the activating apparatus further comprising signal sending means for sending a signal to the driving means in a state in which the off-vehicle power supply is connected, wherein when a signal sent out from the signal sending means is determined to be a predetermined signal differing every disposal of the passive safety device, the driving means outputs the driving signal to the Current controlling means.

Since this activating apparatus of the passive safety device is arranged so that the driving means outputs the driving signal to the current controlling means when the signal sent out from the signal sending means is determined to be the predetermined signal differing every disposal of the passive safety device, the driving signal can be outputted only when the predetermined signal is discriminated.

Another activating apparatus of a passive safety device according to the present invention is an activating apparatus of a passive safety device comprising: a squib for activating the passive safety device for protecting a passenger; current controlling means for controlling an electric current supplied from an on-vehicle power supply to the squib in the event of a crash of a vehicle and for controlling an electric current supplied from an off-vehicle power supply connected at the time of disposal of the passive safety device to the squib; and driving means for outputting a driving signal to the current controlling means so as to supply an electric current from the on-vehicle power supply or the off-vehicle power supply to the squib, thereby activating the passive safety device; the activating apparatus further comprising memory means for storing a fact that the driving means outputted the driving signal to the current controlling means so as to supply the electric current from the off-vehicle power supply to the squib, thereby activating the passive safety device.

Since this activating apparatus of the passive safety device is arranged so that the memory means stores the fact of execution of the activation of passive safety device when the driving means outputs the driving signal to the current controlling means to supply the current from the off-vehicle power supply to the squib and to activate the passive safety device, the fact of execution of activation of passive safety device can be known by referencing the storing means.

Another activating apparatus of a passive safety device according to the present invention is an activating apparatus of a passive safety device comprising an activation executing device for carrying out activation of a passive safety device, and an activation instructing device connected to the activation executing device at the time of disposal of the passive safety device, the activation instructing device giving an instruction of activation of the passive safety device to the activation executing device and supplying an electric current from an off-vehicle power supply to the activation executing device, the activation executing device comprising: a squib for activating the passive safety device for protecting a passenger; current controlling means for controlling an electric current supplied from an on-vehicle power supply to the squib in the event of a crash of a vehicle and for controlling an electric current supplied from an off-vehicle power supply connected at the time of disposal of the passive safety device to the squib; and driving means for outputting a driving signal to the current controlling means so as to supply an electric current from the on-vehicle power supply or the off-vehicle power supply to the squib, thereby activating the passive safety device; wherein when the activation instructing device gives the instruction of activation of the passive safety device, the driving means disables outputting of a driving signal based on the crash of the vehicle to the current controlling means.

Since this activating apparatus of passive safety device is arranged so that the driving means of the activation executing device disables outputting of the driving signal based on the crash to the current controlling means when the activation instructing device gives the instruction of the activation of passive safety device, the current is not supplied from the on-vehicle power supply to the squib at the time of disposal of the passive safety device but the current is supplied from only the off-vehicle power supply to the squib, whereby the disposal of the passive safety device can be performed with accuracy.

This activating apparatus of the passive safety device is characterized by further comprising memory means for storing a fact that the driving means outputted the driving signal to the current controlling means so as to supply the electric current from the off-vehicle power supply to the squib, thereby activating the passive safety device.

Since this activating apparatus of the passive safety device is arranged so that the memory means stores the fact of execution of activation of the passive safety device when the driving means outputs the driving signal to the current controlling means to supply the current from the off-vehicle power supply to the squib and to activate the passive safety device, the fact of execution of activation of the passive safety device can be known by referencing the memory means.

This activating apparatus of the passive safety device is characterized in that the memory means is provided in the activation executing device.

Since this activating apparatus of the passive safety device is arranged so that the memory means is provided in the activation executing device, the driving means can directly make the memory means store the data without intervention of communication means.

This activating apparatus of the passive safety device is characterized in that the memory means is provided in the activation instructing device.

Since this activating apparatus of the passive safety device is arranged so that the memory means is provided in the activation instructing device, there is no need for providing each activation executing device or each vehicle with the memory means.

This activating apparatus of the passive safety device is characterized in that the memory means further stores a fact of completion of the disposal of the passive safety device.

With this activating apparatus of the passive safety device, completion of the disposal of the passive safety device can be checked by simply referencing the memory contents in the memory means.

This activating apparatus of the passive safety device is characterized in that the memory means further stores a number of passive safety devices which have been disposed of.

With this activating apparatus of the passive safety device, the number of the passive safety devices that have been disposed of can be checked by simply referencing the memory contents in the memory means.

This activating apparatus of passive safety device is characterized in that the memory means further stores a type of the vehicle the passive safety device of which has been disposed of.

With this activating apparatus of the passive safety device, the type of the vehicle the passive safety device of which has been disposed of can be checked by simply referencing the memory contents in the memory means.

This activating apparatus of the passive safety device is characterized in that the memory means further stores a frame number of the vehicle the passive safety device of which has been disposed of.

With this activating apparatus of the passive safety device, the frame number of the vehicle the passive safety device of which has been disposed of can be checked by simply referencing the memory contents in the memory means.

Another activating apparatus of a passive safety device according to the present invention is an activating apparatus of a passive safety device comprising: a squib for activating a passive safety device for protecting a passenger; current controlling means for controlling an electric current supplied from an on-vehicle power supply to the squib in the event of a crash of a vehicle and for controlling an electric current supplied from an off-vehicle power supply connected at the time of disposal of the passive safety device to the squib; and driving means for outputting a driving signal to the current controlling means so as to supply an electric current from the on-vehicle power supply or the off-vehicle power supply to the squib, thereby activating the passive safety device; wherein at the time of disposal of a plurality of passive safety devices, the driving means activates a passive safety device for a driver seat last out of these passive safety devices.

Since this activating apparatus of the passive safety device is arranged so that at the time of disposal of plural passive safety devices the driving means activates the driver passive safety device last, the activation of the passive safety device can be suspended before activation of the driver passive safety device having a large inflation amount if an anomaly occurs on the way of successive activation of the plural passive safety devices.

Another activating apparatus of a passive safety device according to the present invention is an activating apparatus of a passive safety device comprising a first activation executing device and a second activation executing device each for executing activation of a passive safety device, first connecting means for electrically connecting the first activation executing device to the second activation executing device, and second connecting means for electrically connecting an activation instructing device for giving an instruction of activation of the passive safety device, to the first activation executing device, wherein when the activation instructing device gives the instruction of activation of the passive safety device through the second connecting means, the activating apparatus is arranged to operate in such a way that, for executing activation of the passive safety device connected to the first activation executing device, an activation signal is outputted to at least one passive safety device connected to the first activation executing device, and that, for executing activation of the passive safety device connected to the second activation executing device, an activation signal is outputted to the second activation executing device through the first connecting means, and then an activation signal is outputted to at least one passive safety device connected to the second activation executing device.

Since this activating apparatus of the passive safety device is arranged to operate with the instruction of activation of the passive safety device from the activation instructing device in such a manner that, for carrying out activation of the passive safety device connected to the first activation executing device, the activation signal is outputted to at least one passive safety device connected to the first activation executing device and that, for carrying out activation of the passive safety device connected to the second activation executing device, the activation signal is outputted to the second activation executing device through the first connecting means so as to output the activation signal to at least one passive safety device connected to the second activation executing device, the apparatus can dispose of not only the passive safety device connected to the first activation executing device, but also the passive safety device connected to the second activation executing device, by simply connecting the activation instructing device to the first activation executing device.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

The activating apparatus of a passive safety device according to the first embodiment of the present invention will be described by reference to the drawings.

Figure 1:
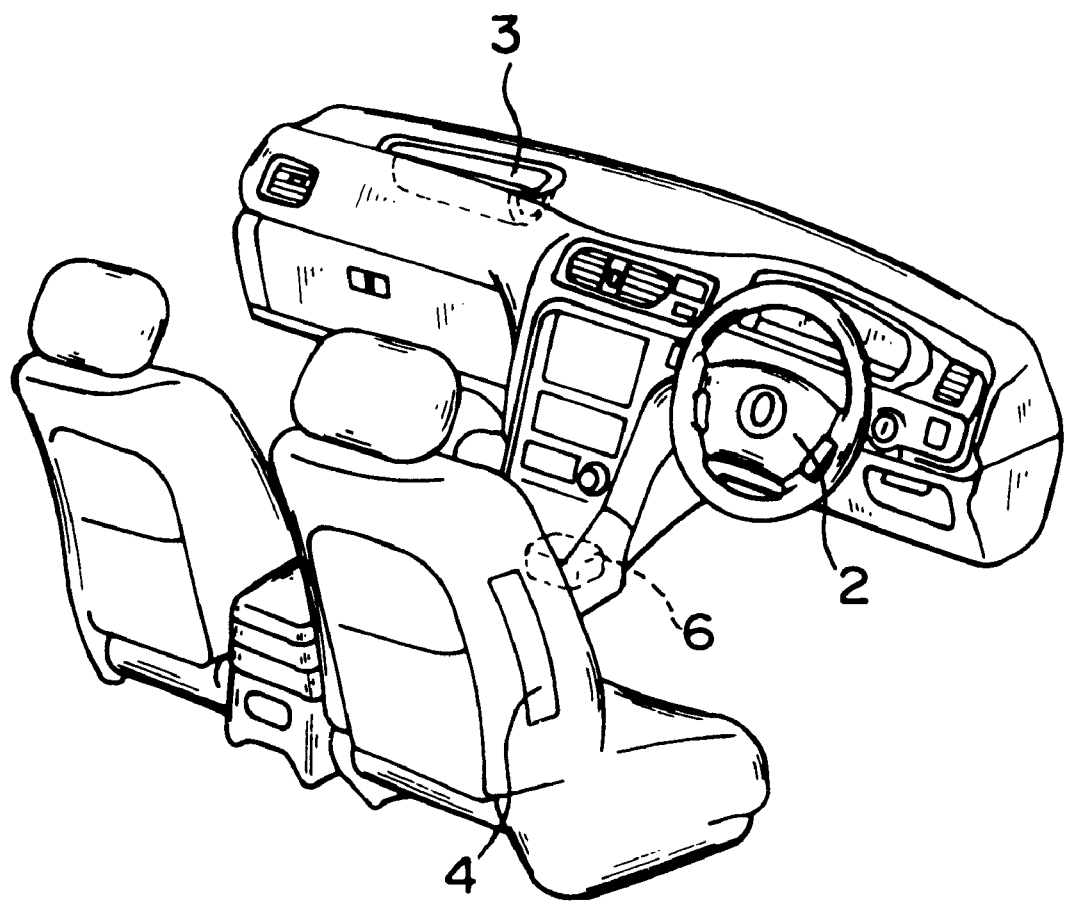
FIG. 1 is a drawing to show an arrangement of air bag devices inside a vehicle according to the first embodiment.

FIG. 1 is a drawing to show an arrangement of air bag devices inside a vehicle. Inside the vehicle, an air bag device 2 for driver seat and an air bag device 3 for passenger seat are installed and a front side air bag device 4 and other devices are also placed. The driver air bag device 2, passenger air bag device 3, and front side air bag device 4 are provided with squibs 2a, 3a, 4a (see FIG. 2) for activating the respective air bag devices and an ECU (electronic control unit) 6 for controlling activation of the air bag devices. Each of the squibs 2a, 3a, 4a, together with a gas generating agent (not illustrated), is housed in an inflator (not illustrated) and a bag (not illustrated) is integrally mounted in each inflator.

Figure 2:
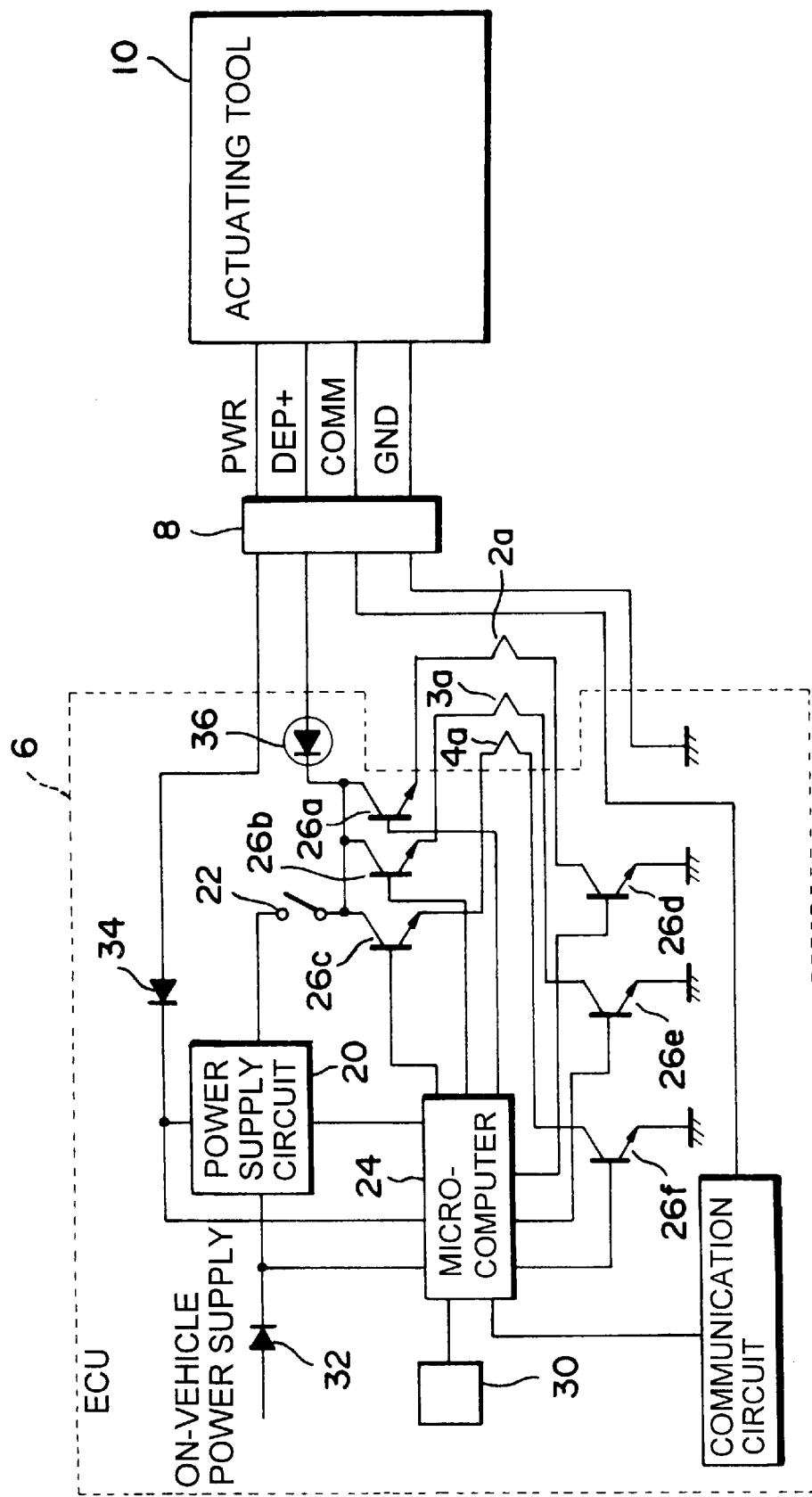
FIG. 2 is a diagram to show the structure of the activating apparatus of a passive safety device according to the first embodiment.

FIG. 2 is a diagram to show the structure of the activating apparatus of air bag device for forcedly actuating the driver air bag device 2, passenger air bag device 3, and side air bag device 4. This activating apparatus of air bag device is composed of the ECU 6 (activation executing device) and an actuating tool 10 (activation instructing device) to be connected through connector 8 to the ECU 6 at the time of forced actuation of the passive safety devices.

The ECU 6 is composed mainly of a power supply circuit 20, a safing sensor 22, a microcomputer 24, firing transistors 26a, 26b, 26c, 26d, 26g, 26f, a communication circuit 28, and a memory 30.

Among the components of the ECU 6, the power supply circuit 20 functions to produce a predetermined voltage to be applied to the squibs 2a, 3a, 4a, from the source voltage obtained through diode 32 from the on-vehicle power supply the battery mounted on the vehicle and to apply the thus produced voltage to the squibs 2a, 3a, 4a; further, the power supply circuit 20 also functions to produce a predetermined voltage to be applied to the microcomputer 24 and to apply the produced voltage to the microcomputer 24.

The safing sensor 22 is positioned between the power supply circuit 20 and the squibs 2a, 3a, 4a and is normally in an off state to keep the circuit electrically open between the power supply circuit 20 and the squibs 2a, 3a, 4a. If impact is exerted on the vehicle and if the magnitude of the impact exceeds a predetermined value, the safing sensor 22 will become on to electrically close the circuit between the power supply circuit 20 and the squibs 2a, 3a, 4a.

The microcomputer 24 determines whether the magnitude of the impact exerted on the vehicle and detected by an acceleration sensor (G sensor) not illustrated exceeds the predetermined value and, based on the result of the determination, the microcomputer 24 controls on/off of the firing transistors 26a, 26b, 26c placed between the squibs 2a, 3a, 4a and the safing sensor 22 and also controls on/off of the firing transistors 26d, 26e, 26f placed between the squibs 2a, 3a, 4a and the ground (GND).

Further, the communication circuit 28 controls communication with the actuating tool 10 connected through the connector 8 at the time of forced activation of the air bag devices, and the memory 30 stores the result of activation in the event of forced activation of passive safety device, and other data.

Next, the actuating tool 10 to be connected to the ECU 6 at the time of forced activation of the air bag devices will be described.

This actuating tool 10 is arranged to be connected to the ECU 6 through the connector 8 having four terminals, a power supply terminal (PWR terminal), a firing power terminal (DEP+ terminal), a communication terminal (COMM terminal), and a ground-terminal (GND terminal), as shown in FIG. 2. The PWR terminal of the connector 8 is connected through diode 34 to the power supply circuit 20 of ECU 6 to apply a voltage for actuating the microcomputer 24 to the power supply circuit 20. The DEP+ terminal is connected through bypass diode 36 to the upstream side of the firing transistors 26a, 26b, 26c to apply a voltage for firing the squibs 2a, 3a, 4a thereto. The COMM terminal is connected to the communication circuit 28 to form a communication line between the ECU 6 and the actuating tool 10. The GND terminal is connected to GND in the ECU 6.

Figure 3:
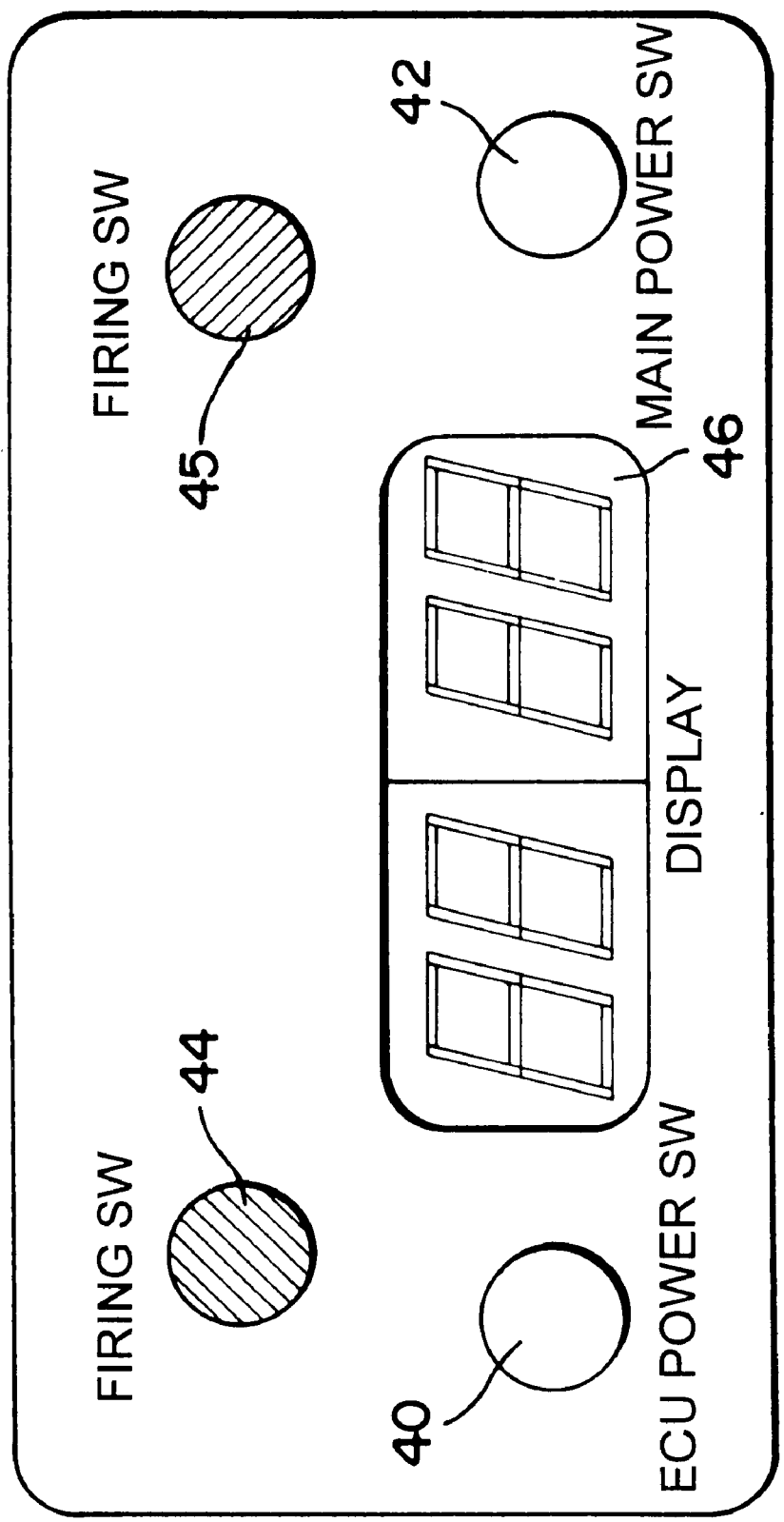
FIG. 3 is a diagram to show a final controlling unit of an actuating tool in the activating apparatus of a passive safety device according to the first embodiment.

FIG. 3 is a drawing to show a final controlling element of the actuating tool 10. This final controlling element has an ECU power SW 40 for applying an actuation voltage to the ECU 6, a main power SW 42 for turning the power of this actuating tool 10 on, a firing switch 44 and a firing switch 45 for forced activation of air bag device, and a 7-segment display 46.

Figure 4:
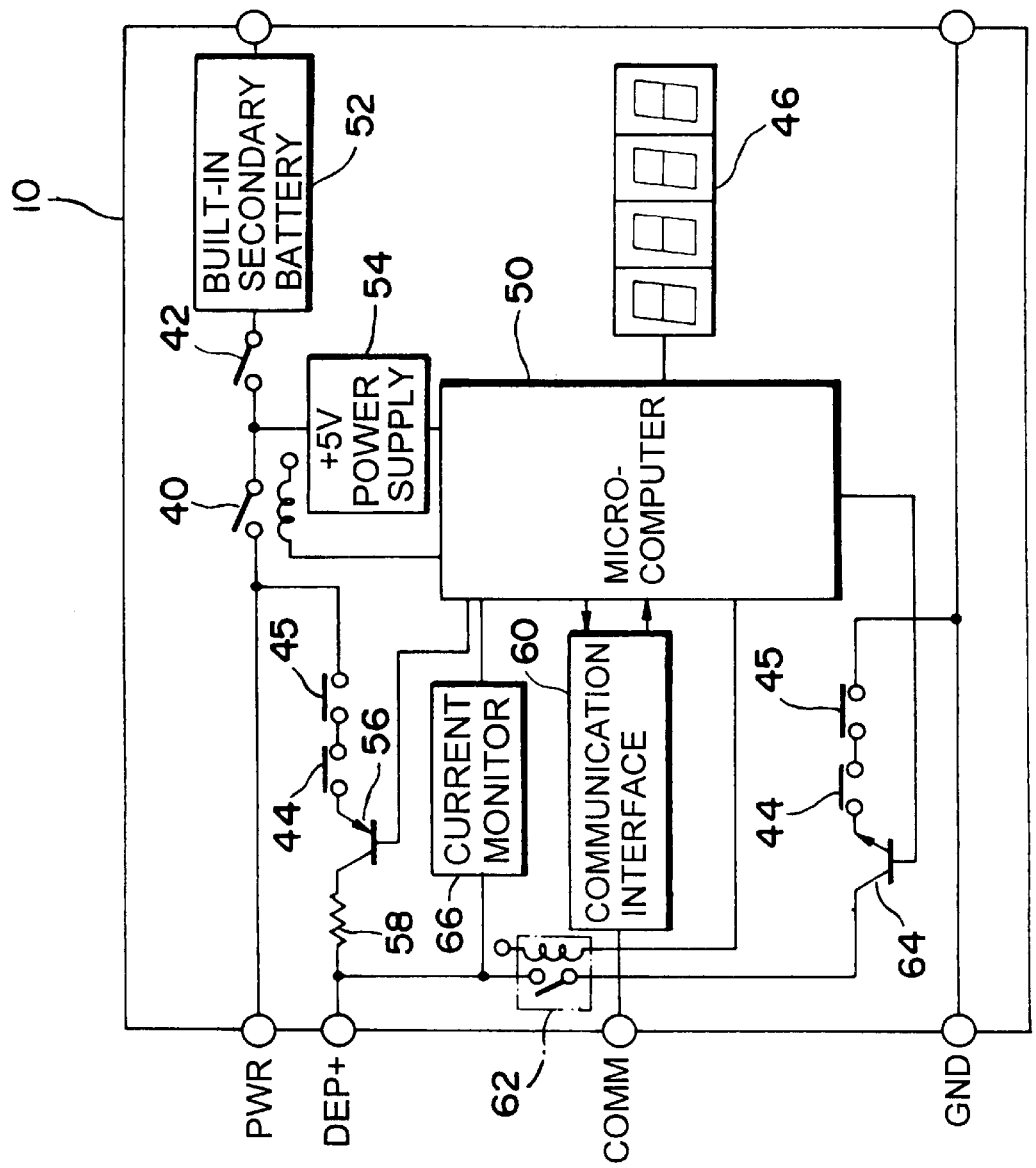
FIG. 4 is a diagram to show the structure of the actuating tool in the activating apparatus of a passive safety device according to the first embodiment.

FIG. 4 is a diagram to show the structure of the actuating tool 10. This actuating tool 10 is arranged to be controlled by microcomputer 50, and at the time of forced activation of the air bag device the actuating tool 10 functions to send a control signal for forced activation of air bag device to the ECU 6 and to apply a voltage of built-in secondary battery 52 to the squibs 2a, 3a, 4a.

The built-in secondary battery 52 of the actuating tool 10 has the capacity enough to activate air bag devices of three to five vehicles. When the main power SW 42 of the actuating tool 10 is turned on, a +5V-power supply 54 produces a voltage applied to the microcomputer 50 from the voltage of the built-in secondary battery 52 and the voltage is applied to the microcomputer 50. When the main power SW 42 and ECU power SW 40 are turned on, the voltage of the built-in secondary battery 52 is applied through the PWR terminal to the power supply circuit 20 of the ECU 6 and the power supply circuit 20 produces the predetermined voltage for the microcomputer 24 and applies it thereto.

The voltage of the built-in secondary battery 52 is applied through the main power SW 42, ECU power SW 40, firing switches 45, 44, transistor 56, and resistor 58 to the DEP+ terminal. A communication interface 60 is provided between the COMM terminal and the microcomputer 50.

The line between the resistor 58 and the DEP+ terminal is connected through relay 62, transistor 64, and firing switches 44, 45 to GND. The relay 62 is kept on before the forced activation of air bag device, thereby preventing the voltage from being applied to the squibs 2a, 3a, 4a through the DEP+ terminal before the forced activation of air bag device. A current monitor 66 is also provided for detecting the electric current on the upstream side of the relay 62.

Next described is the forced activation of the air bag device by this activating apparatus of a passive safety device.

For carrying out the forced activation of the air bag device by the activating apparatus of the passive safety device, an operator first turns the on-vehicle power supply off and thereafter connects the actuating tool 10 to the ECU 6 through the connector 8. Then the operator turns the main power SW 42 on to turn the power of the actuating tool 10 on and further turns the ECU power SW 40 on to apply the actuation voltage to the microcomputer 24 of ECU 6.

Figure 5:
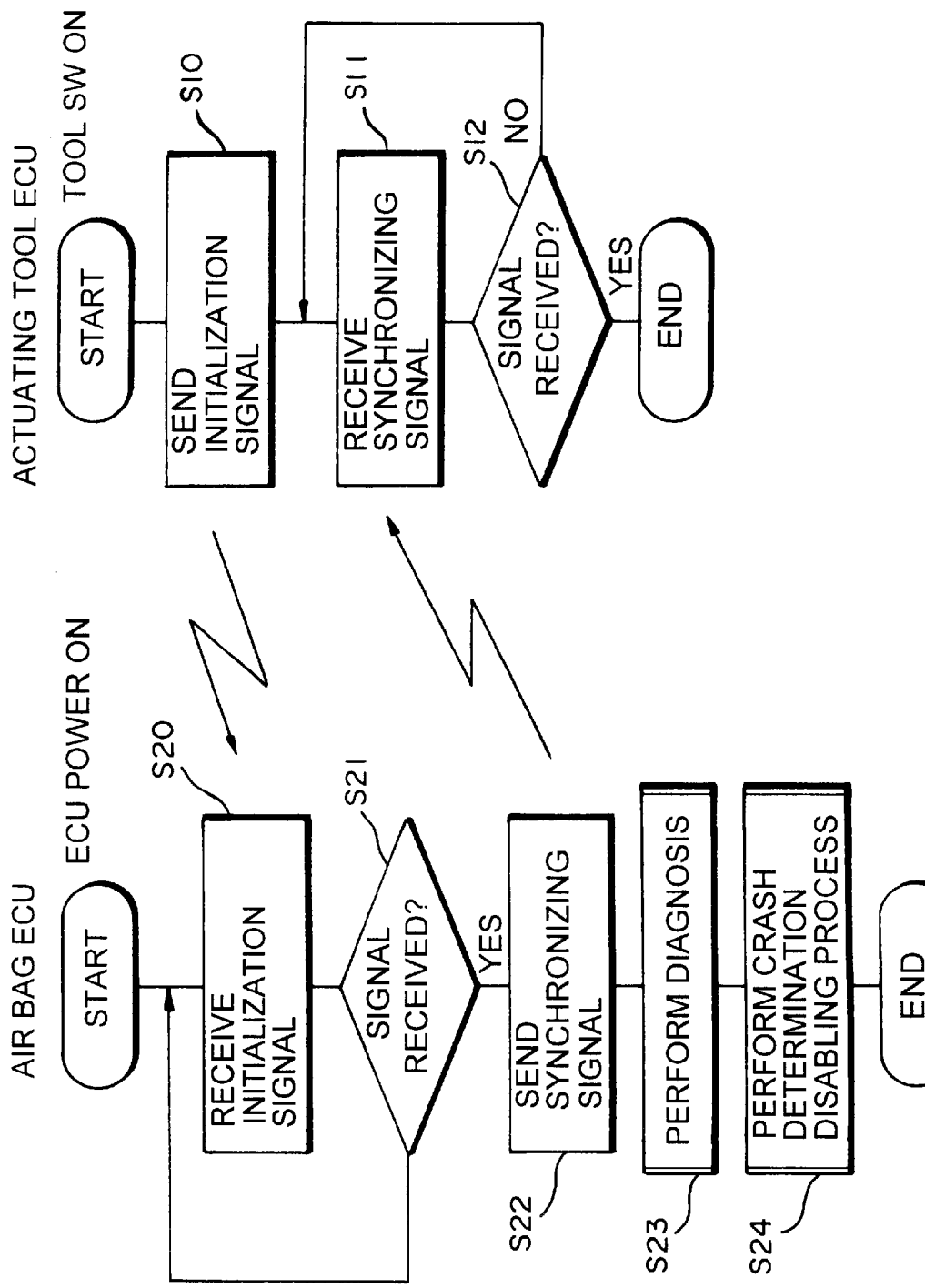
FIG. 5 is flowcharts of an initialization process of the activating apparatus of a passive safety device according to the first embodiment.

This starts a process for initialization shown in the flowcharts of FIG. 5, in the microcomputer 50 of the actuating tool 10 and in the microcomputer 24 of ECU 6. Specifically, the microcomputer 50 of the actuating tool 10 first sends an initialization signal to the communication circuit 28 of ECU 6 through the communication interface 60 (step 10).

The microcomputer 24 of ECU 6 is in a process for receiving the initialization signal while controlling the communication circuit 28 (step 20). The microcomputer repeats the process of step 20 and step 21 as long as no initialization signal is received. Once the initialization signal is received (step 21), the microcomputer 24 sends a synchronizing signal through the communication circuit 28 (step 22).

The microcomputer 50 of the actuating tool 10 is in a process for receiving the synchronizing signal after having sent the initialization signal (step 11). The microcomputer 50 repeats the process of step 11 and step 12 as long as no synchronizing signal is received. Once the synchronizing signal is received (step 12), the microcomputer 50 terminates the process for initialization in the actuating tool 10. On the other hand, the microcomputer 24 of ECU 6 performs a diagnosis of the air bag devices after having sent the synchronizing signal (step 23), then performs a disabling process of crash determination (step 24), and then terminates the process for initialization in the ECU 6.

Figure 6:
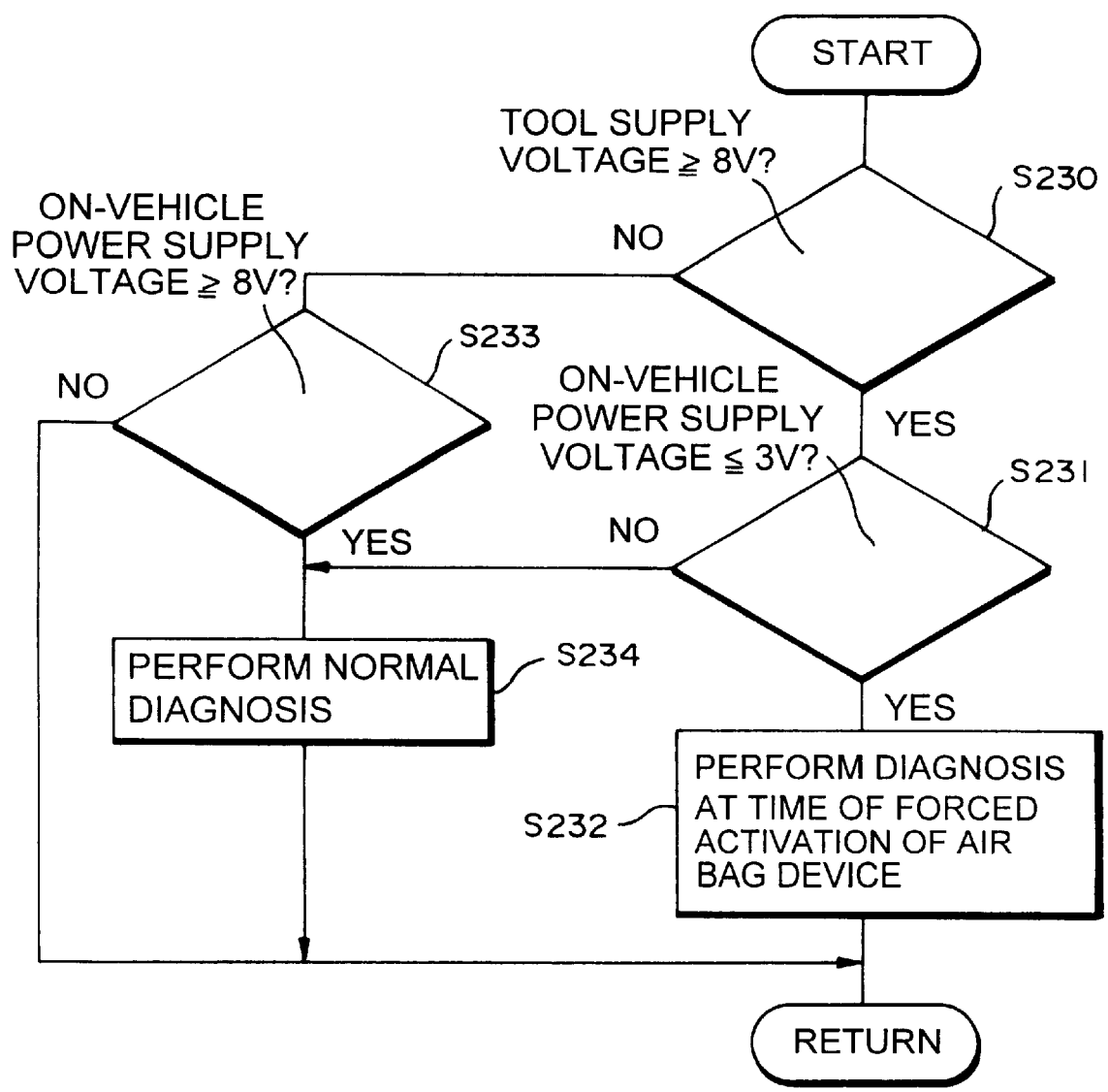
FIG. 6 is a flowchart of diagnosis of the activating apparatus of a passive safety device according to the first embodiment.

Here, the diagnosis (step 23) executed by the microcomputer 24 of ECU 6 is carried out according to the process shown in the flowchart of FIG. 6. First, it is determined whether the tool supply voltage (off-vehicle supply voltage) is not less than 8 V (step 230). This determination of whether the tool supply voltage is not less than 8 V is carried out by detecting the voltage downstream of the diode 34 by the microcomputer 24.

When in this process of step 230 the tool supply voltage is determined to be not less than 8 V, it is determined whether the on-vehicle power supply voltage is not more than 3 V (step 231). The determination of whether the on-vehicle power supply voltage is not more than 3 V is done by detecting the voltage downstream of the diode 32 by the microcomputer 24. When in this process of step 231 the on-vehicle power supply voltage is determined to be not more than 3 V, the diagnosis at the time of forced activation of air bag device is carried out; i.e., the diagnosis is disabled on the operation of the firing transistors 26a, 26b, 26c, 26d, 26e, 27f while the diagnosis is carried out only on the operation of the G sensor, microcomputer 24, etc. (step 232).

When in the above process of step 230 the tool supply voltage is determined to be less than 8 V, it is determined whether the on-vehicle power supply voltage is not less than 8 V (step 233). When in this process of step 233 the on-vehicle power supply voltage is determined to be not less than 8 V or when in the process of step 231 the on-vehicle power supply voltage is determined to be more than 3 V, the normal diagnosis is carried out; i.e., the diagnosis is carried out on the operation of the G sensor, microcomputer 24, firing transistors 26a, 26b, 26c, 26d, 26e, 26f, etc. (step 234).

Figure 7:
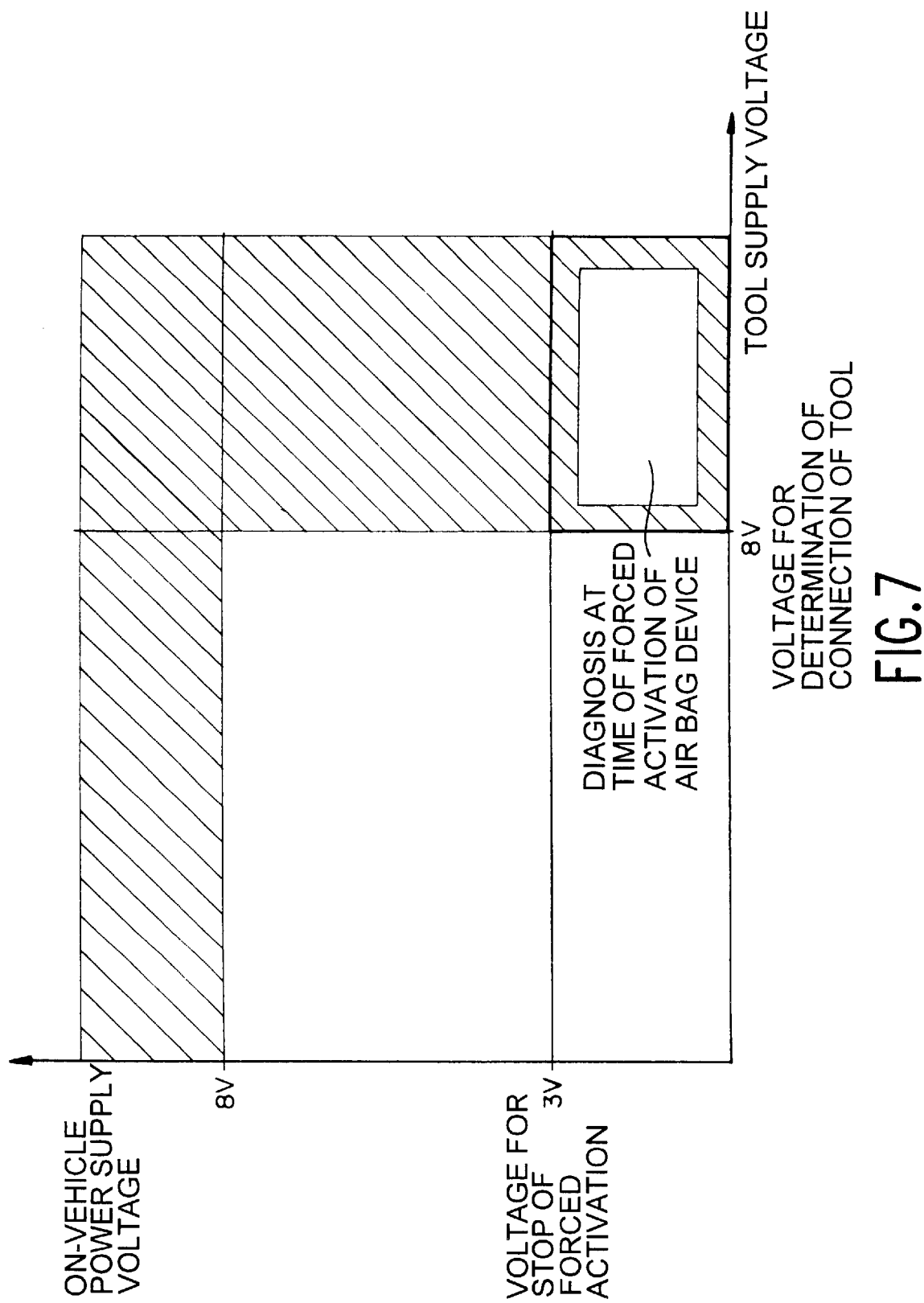
FIG. 7 is a diagram to show the range of execution of the diagnosis in the activating apparatus of a passive safety device according to the first embodiment.

Accordingly, when the tool supply voltage and on-vehicle power supply voltage satisfy the conditions represented by the range inside the thick solid line shown in FIG. 7, the diagnosis at the time of forced activation of the air bag device is carried out under judgment that the on-vehicle power supply is off and that the current for the forced activation of the air bag device is supplied from the activating tool 10 to the ECU 6. When the tool supply voltage and on-vehicle power supply voltage satisfy the conditions indicated by the hatched range except for the range inside the thick solid line shown in FIG. 7, the normal diagnosis is carried out. When the tool supply voltage and on vehicle power supply voltage satisfy the conditions except for the hatched range shown in FIG. 7, no diagnosis is carried out.

Figure 8:
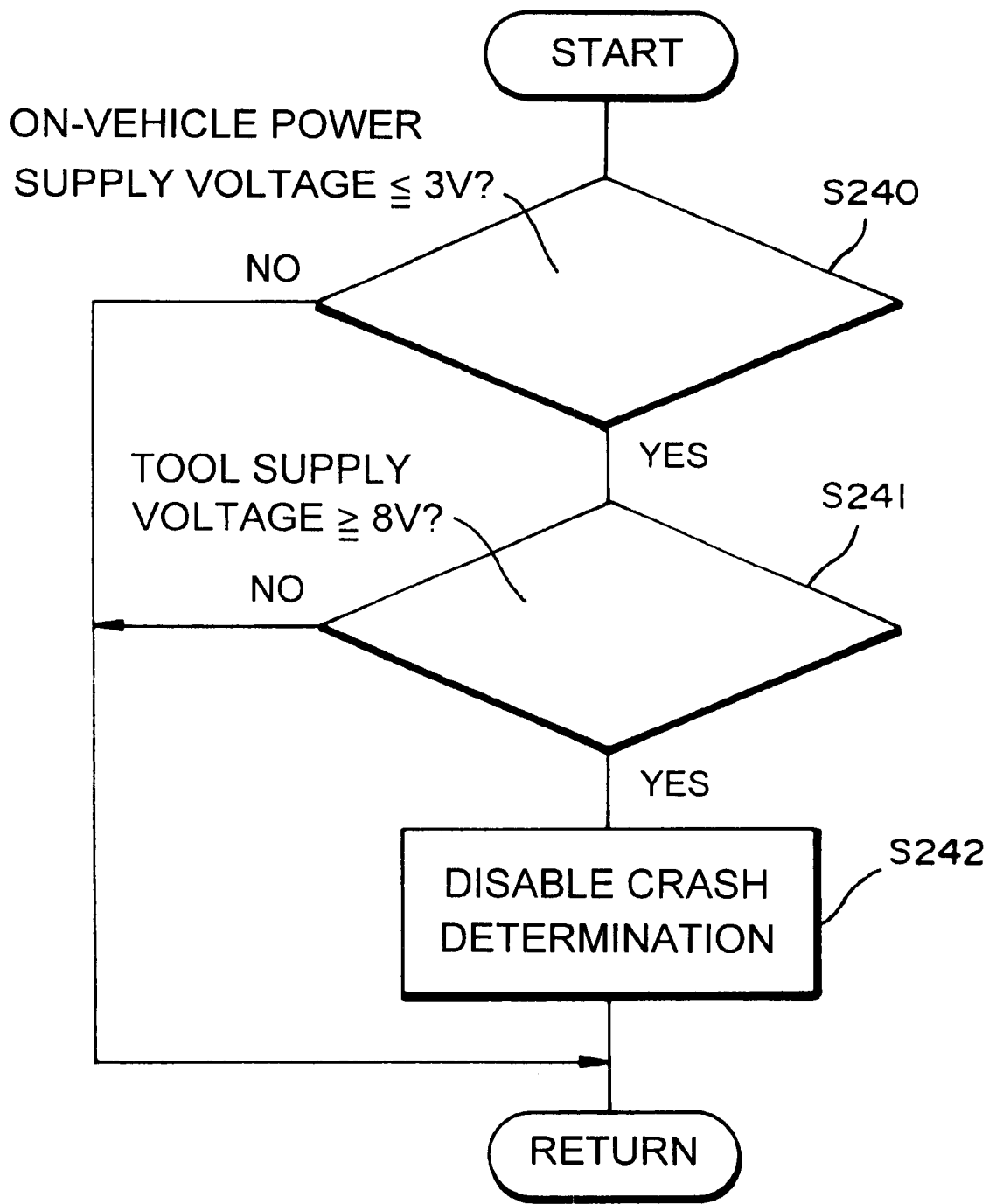
FIG. 8 is a flowchart of a crash determination disabling process in the activating apparatus of a passive safety device according to the first embodiment.

The crash determination disabling process (step 24) executed by the microcomputer 24 of ECU 6 is carried out according to the process shown in the flowchart of FIG. 8. First, it is determined whether the on-vehicle power supply voltage is not more than 3 V (step 240). When in this process of step 240 the on-vehicle power supply voltage is determined to be not more than 3 V, it is further determined whether the tool supply voltage is not less than 8 V (step 241).

Figure 9:
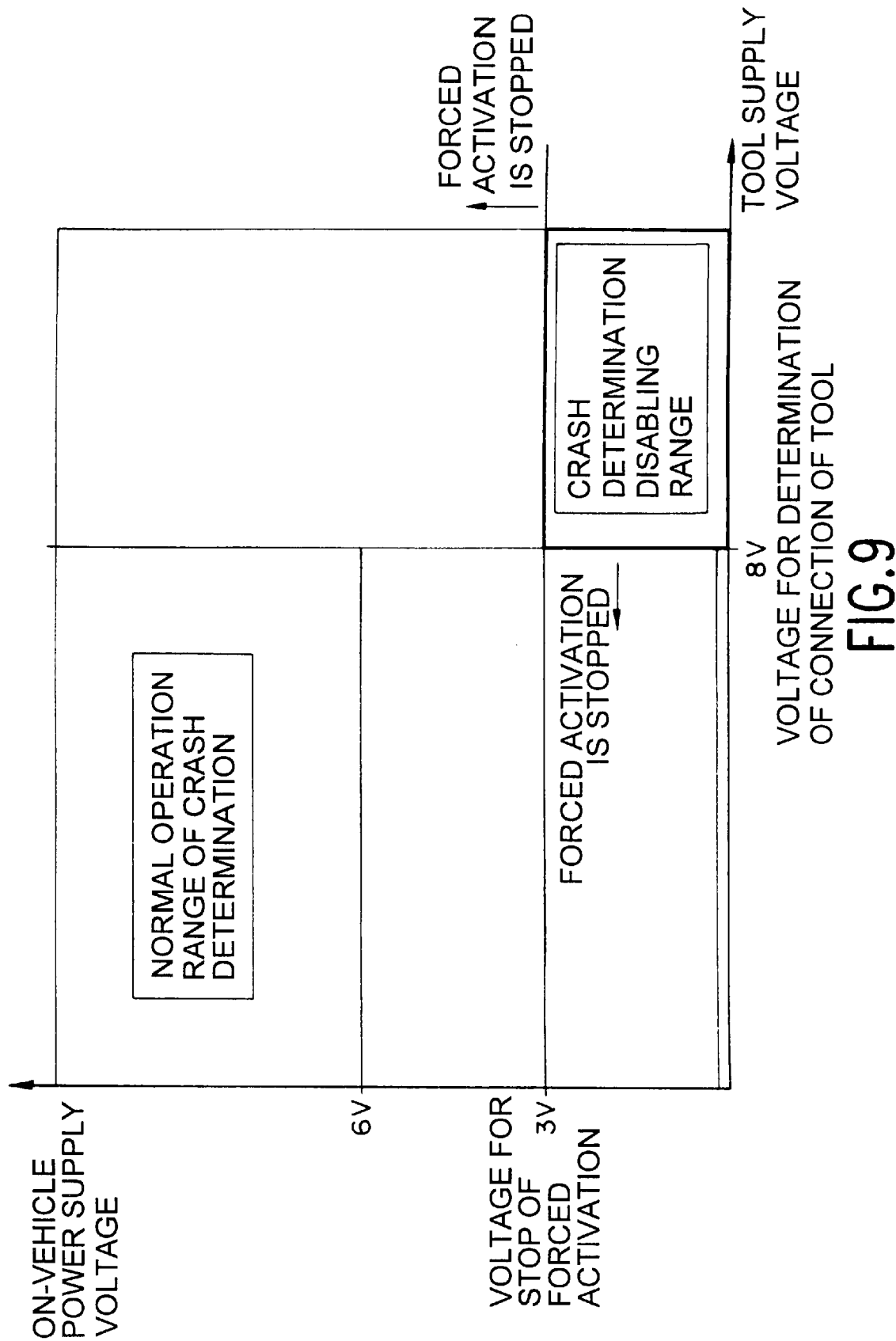
FIG. 9 is a diagram to show the crash determination disabling range in the activating apparatus of a passive safety device according to the first embodiment.

When in this process of step 241 the tool supply voltage is determined to be not less than 8 V, the crash determination carried out by the microcomputer 24 of ECU 6 is disabled (step 242). Namely, when the tool supply voltage and on-vehicle power supply voltage satisfy the conditions indicated by the range inside the thick solid line shown in FIG. 9, the crash determination executed by the microcomputer 24 of ECU 6 is disabled and outputting of an activation signal to the firing transistors 26a, 26b, 26c, 26d, 26e, 26f is also disabled under judgment that the forced activation of the air bag device is under way.

Next described is the forced activation process of the air bag device carried out after completion of the initialization process (which is shown in FIG. 5).

Figure 10:
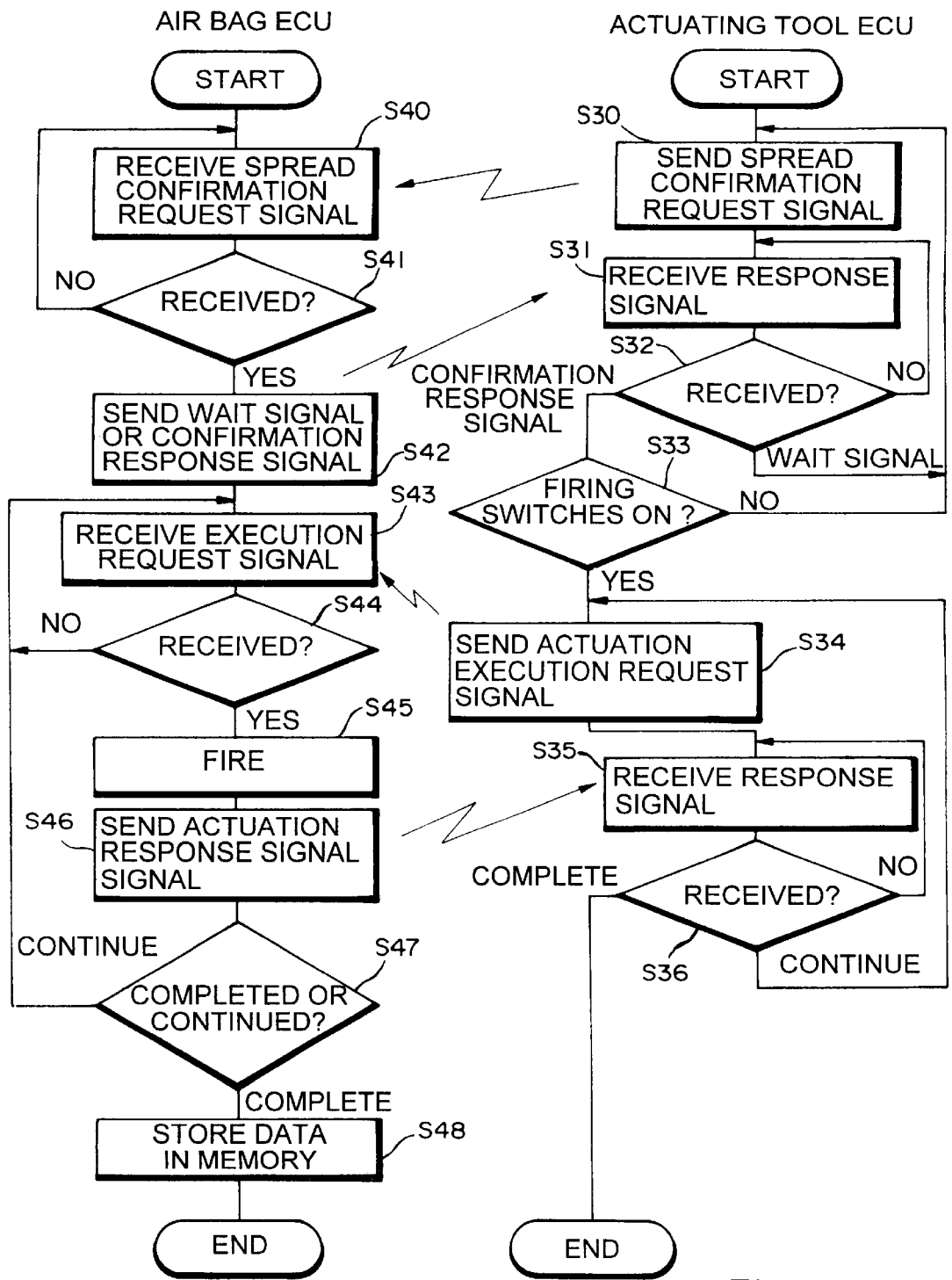
FIG. 10 is flowcharts of a forced activation process in the activating apparatus of a passive safety device according to the first embodiment.

After completion of the above initialization process, the forced activation process of air bag device shown in the flowchart of FIG. 10 is carried out in the microcomputer 50 of actuating tool 10 and in the microcomputer 24 of ECU 6.

The microcomputer 50 of the actuating tool 10 first sends a spread confirmation request signal to the communication circuit 28 of ECU 6 through the communication interface 60 (step 30). The microcomputer 24 of ECU 6 is in a process for receiving the spread confirmation request signal while controlling the communication circuit 28 (step 40). The microcomputer 24 repeats the process of step 40 and step 41 as long as no spread confirmation request signal is received. On the other hand, when the spread confirmation request signal is received (step 41), the microcomputer 24 sends a WAIT signal or a confirmation response signal (step 42).

When the ECU 6 receives the spread confirmation request signal, it determines whether the current now supplied is one supplied from the actuating tool 10 or one supplied from a backup capacitor or the like not illustrated immediately after off of the on-vehicle power supply. While the ECU 6 cannot make a decision, it sends the WAIT signal. The ECU 6 sends the confirmation response signal when it makes a decision. The confirmation response signal is a signal comprised of an identification number of the ECU 6 itself and a number of air bag devices to be activated by the ECU 6, and the identification number is comprised of a random value differing every disposal of an air bag device.

After having sent the spread confirmation request signal, the microcomputer 50 of the actuating tool 10 is in a process for receiving the WAIT signal or the confirmation response signal (step 31). The microcomputer 50 repeats the process of step 31 and step 32 before receiving either the WAIT signal or the confirmation response signal. On the other hand, when the WAIT signal or the confirmation response signal is received (step 32), the microcomputer 50 returns to the process of step 30 with reception of the WAIT signal to send the spread confirmation request signal again (step 30).

When the signal received in the process of step 32 is the confirmation response signal, the number of air bag devices to be forcedly activated is indicated in the 7-segment display 46 and a determination is made on whether the firing switches 44, 45 are on (step 33). When the firing switches 44, 45 are off, the microprocessor 50 returns to the process of step 30 to send the spread confirmation request signal again (step 30) and repeats the process of step 30 to step 33 before the firing switches 44, 45 become on.

It is determined in step 33 whether the firing switches 44, 45 are turned on simultaneously. When the firing switches 44, 45 are determined to be turned on simultaneously, the transistors 56, 64 are turned on and the actuating tool 10 sends an actuation execution request signal to the ECU 6 (step 34). The actuation execution request signal is a signal obtained by inverting bits of the confirmation response signal received in the process of step 32.

After having sent the confirmation response signal, the microcomputer 24 of ECU 6 is in a process for receiving the actuation execution request signal (step 43, step 44). When receiving the actuation execution request signal, the microcomputer 24 outputs an activation signal for activating the air bag device in the first group. Specifically, the microcomputer 24 outputs the activation signal for activating the side air bag device 4 and other devices, if any, included in the first group to the firing transistors 26c, 26f etc. for firing the squib 4a of the side air bag device 4 to turn the firing transistors 26c, 26f etc. on (step 45).

This causes the current to be supplied from the built-in secondary battery 52 of the actuating tool 10 to the squib 4a of the side air bag device 4 through the DEP+ terminal and to forcedly activate the side air bag device, thus completing the disposal of the side air bag device 4 etc. included in the first group.

In this activating apparatus of air bag device the air bag devices to be forcedly activated are classified into the first group including the side air bag device 4 etc. and the second group including the driver air bag device 2, the passenger air bag device 3, and so on.

Then the microcomputer 24 of ECU 6 sends an actuation result response signal to the actuating tool 10 (step 46). Specifically, the microcomputer 24 of ECU 6 sends the actuation result response signal indicating "complete" through the communication circuit 28 when the forced activation of the all groups (the first group and second group) of the air bag devices to be forcedly activated is completed. When the forced activation of the all groups of the air bag devices to be forcedly activated is not completed yet, the microcomputer 24 sends the actuation result response signal indicating "continue" through the communication circuit 28.

When the actuation result response signal sent is the signal indicating "continue" (step 47), the microcomputer 24 of ECU 6 returns to the process of step 43 to carry out the process for receiving the next actuation execution request signal (step 43, step 44).

After having sent the actuation execution request signal, the microcomputer 50 of the actuating tool 10 is in a process for receiving the actuation result response signal (step 35). The microcomputer 50 repeats the process of step 35 and step 36 before receiving the actuation result response signal. On the other hand, when the microcomputer 50 receives the actuation result response signal and when it is the actuation result response signal indicating "continue" (step 36), the microcomputer 50 returns to step 34 to send the actuation execution request signal again.

After having sent the actuation result response signal indicating "continue," the microcomputer 24 of ECU 6 is in the process for receiving the actuation execution request signal (step 43, step 44). When receiving the actuation execution request signal, the microcomputer 24 outputs an activation signal for activating the air bag devices in the second group. Specifically, the microcomputer 24 outputs the activation signal for activating the driver air bag device 2, passenger air bag device 3, etc. included in the second group to the firing transistors 26a, 26d, 26b, 26e, etc. for firing the squib 2a of the driver air bag device 2, the squib 3a of the passenger air bag device 3, and so on, thereby turning the firing transistors 26a, 26d, 26b, 26e, etc. on.

This causes the current to be supplied from the built-in secondary battery 52 of the actuating tool 10 to the squib 2a of the driver air bag device 2 and to the squib 3a of the passenger air bag device 3 through the DEP+ terminal to forcedly activate the air bag devices, thus completing the disposal of the driver air bag device 2, passenger air bag device 3, etc. included in the second group. The forced activation of the driver air bag device 2 is carried out last out of the air bag devices of the second group. Namely, the driver air bag device 2 is forcedly activated finally a predetermined time after the forced activation of the air bag device except for the driver air bag device 2, i.e., after the forced activation of the passenger air bag device 3 and the other devices. Therefore, if an anomaly occurs on the way of execution of the forced activation of an air bag device, the forced activation of the air bag device can be suspended before activation of the driver air bag device 2 an inflation amount of which is large.

When the forced activation of the air bag devices of the second group is completed, the ECU 6 sends the actuation result response signal indicating "complete" to the actuating toot 10 through the communication circuit 28 (step 46, step 47). Then step 48 is carried out to store in the memory 30 the fact that the forced activation of the air bag devices is completed, i.e., the fact that the disposal of the air bag devices is finished, and then the forced activation process of air bag device in the ECU 6 is terminated.

On this occasion, the memory 30 is also made simultaneously to store a number of air bag devices having been disposed, a type of the vehicle the disposal of air bag devices of which is completed, and a frame number of the vehicle.

On the other hand, when the signal received in the process of step 35 is the actuation result response signal indicating "complete" (step 36), the microcomputer 50 of the actuating tool 10 terminates the forced activation process of the air bag device in the actuating tool 10.

The data stored in the memory 30, including the fact that the disposal of air bag devices is finished, the number of air bag devices having been disposed of, the type of the vehicle the disposal of air bag devices of which is completed, and the frame number of the vehicle, can be utilized for keeping track of the situation of disposal of air bag devices, for example, by connecting a communication device not illustrated to the ECU 6 and collecting these data by a data management system not illustrated through the communication device.

If during execution of the above initialization process (FIG. 5) and forced activation process of the air bag device (FIG. 10) the microcomputer 24 of ECU 6 detects presence of either one of a fact that the on vehicle power supply is turned on, a fact that a time out of communication response is detected, a fact that a signal is received from another apparatus different from the apparatus now in communication, or a fact that disablement of crash determination (FIG. 8) is not carried out within a predetermined time from on of the ECU power SW 40, the microcomputer 24 will suspend the initialization process (FIG. 5) and the forced activation process of the air bag device (FIG. 10). Therefore, the forced activation of air bag device is not carried out.

In this activating apparatus of air bag device, the forced activation of the air bag device is disabled when the on-vehicle power supply voltage is not less than 6 V (i.e., when the on-vehicle power supply is on) and when the tool supply power voltage is not more than 8 V. Namely, in the normal operating range of crash determination shown in FIG. 9, it is determined that the ECU 6 is in the normal operation, the forced activation of the air bag device by the actuating tool 10 is disabled, and the crash determination by the ECU 6 is carried out when the impact is exerted on the vehicle. Therefore, in this case, the apparatus is arranged to disable outputting of the squib activation signal for the disposal of passive safety device, i.e., outputting of the squib activation signal resulting from manipulation of the actuating tool 10.

The activating apparatus of the air bag device according to the present embodiment can actuate a plurality of air bag devices with accuracy and can thus readily dispose of the air bag devices mounted on the vehicle before scrapping thereof. Since this activating apparatus of an air bag device is arranged to activate the air bag devices every group without activating the plural air bag devices at one time, it causes smaller noise upon activation and decreases the possibility of breakage of the vehicle upon activation, as compared with the case where the plural air bag devices are activated simultaneously.

The embodiment described above is arranged to execute the diagnosis upon the forced activation of the air bag device when the tool supply voltage is not less than 8 V (or when the main power SW 42 and ECU power SW 40 are on) and when the on-vehicle power supply voltage is not more than 3 V (or when the on-vehicle power supply is off); but, without having to be limited to this, the apparatus may be arranged in such a configuration that when the tool supply voltage is not less than 8 V or when the on-vehicle power supply voltage is not more than 3 V, the diagnosis upon the forced activation of the air bag device is carried out based on determination of only either the tool supply voltage of not less than 8 V or the on-vehicle power supply voltage of not more than 3 V. In this case, the tool supply voltage of not less than 8 V is determined by detecting the voltage downstream of the diode 34 by the microcomputer 24 and the on-vehicle power supply voltage of not more than 3 V is determined by detecting the voltage downstream of the diode 32 by the microcomputer 24.

The embodiment described above is arranged to disable the crash determination when the on-vehicle power supply voltage is not more than 3 V and when the tool supply voltage is not less than 8 V; however, without having to be limited to this, the apparatus may be arranged in such a configuration that when the on-vehicle power supply voltage is not more than 3 V or when the tool supply voltage is not less than 8 V, the crash determination is disabled based on determination of only either the on-vehicle power supply voltage of not more than 3 V or the tool supply voltage of not less than 8 V. Also in this case, the tool supply voltage of not less than 8 V is determined by detecting the voltage downstream of the diode 34 by the microcomputer 24 and the on-vehicle power supply voltage of not more than 3 V is determined by detecting the voltage downstream of the diode 32 by the microcomputer 24.

The embodiment described above is arranged to disable the forced activation of the air bag device by the actuating tool 10 when the on-vehicle power supply voltage is not less than 6 V (or when the on-vehicle power supply is on) and when the tool supply power voltage is not more than 8 V (or when the tool power supply is off); however, without having to be limited to this, the apparatus may be arranged in such a configuration that when the on-vehicle power supply is on or when the tool power supply is off, the forced activation of the bag device is disabled based on determination of either on of the on-vehicle power supply or off of the tool power supply and that the crash determination by the ECU 6 is carried out when the impact is exerted on the vehicle. Also in this case, the tool supply voltage of not more than 8 V is determined by detecting the voltage downstream of the diode 34 by the microcomputer 24 and the on-vehicle power supply voltage of not less than 6 V is determined by detecting the voltage downstream of the diode 32 by the microcomputer 24.

The embodiment described above is arranged to have the built-in secondary battery 52 in the actuating tool 10, but, without having to be limited to this, the apparatus may be arranged in such a configuration that a primary battery such as a dry battery is mounted in the actuating tool 10 and the power of 12 V is created by this primary battery to supply the current to the ECU 6. In another configuration, an external power supply of 12 V may be connected to the actuating tool 10 so that the current is supplied from this external power supply. In a further configuration, the current may be supplied from an ac power supply of 100 V through a 100 V-ac adapter to the actuating tool 10.

The embodiment described above was described as to the activating apparatus of an air bag device, but the apparatus may be arranged to forcedly activate a seat belt pretensioner or the like in the same manner as in the case of the air bag devices. In this case, the seat belt pretensioner is preferably included in the first group of air bag devices to be forcedly activated, as well as the side air bag device 4.

The embodiment described above is arranged to separate the air bag devices to be forcedly activated into the two groups, the first group and second group, but they may be separated into three or more groups and be successively activated group by group. Also in this case, the driver air bag device should be preferably included in the group of air bag devices to be activated last.

Figure 11:
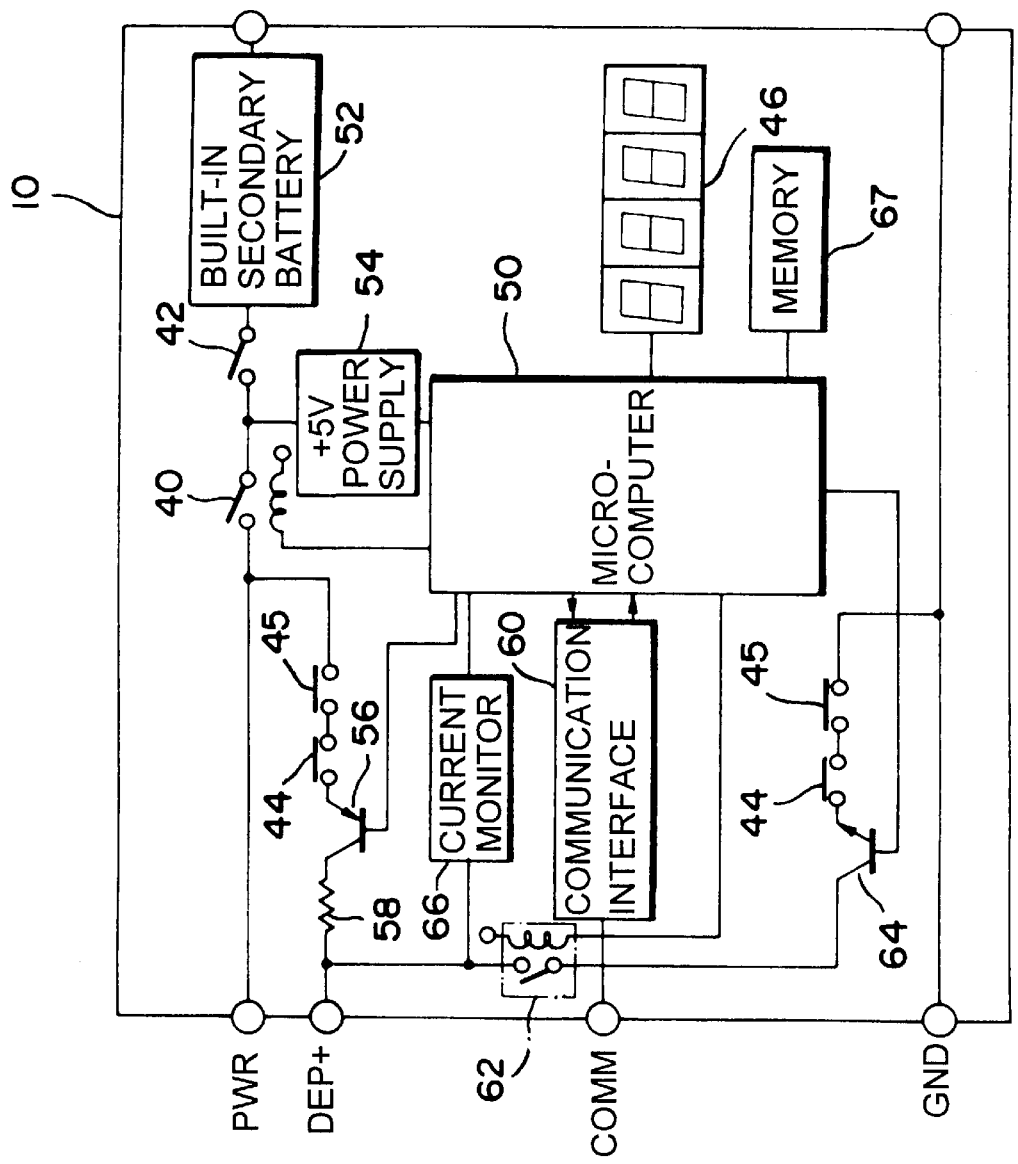
FIG. 11 is a diagram to show the structure of a modification of the actuating tool in the activating apparatus of a passive safety device according to the first embodiment.

The embodiment described above is arranged to have the memory 30, which stores the fact that the disposal of the air bag device is finished, etc., in the ECU 6, but the apparatus may be arranged to provide the actuating tool 10 with a memory 67 as shown in FIG. 11. In this case the apparatus may be arranged in such a configuration that the communication device is connected to the actuating tool 10 and these data stored in the memory 67 is collected through this communication device by the data management system.

The embodiment described above is arranged to connect the communication device to the ECU 6 and collect the data through this communication device, but the data may be collected through a recording medium such as a floppy disk. Further, the data may be printed on an output sheet by a printer so that the data is collected by this output sheet.

The embodiment described above is arranged to detect the tool supply voltage by detecting the voltage downstream of the diode 34, i.e., the voltage of the PWR terminal by the microcomputer 24, but the tool supply voltage may be detected by detecting the voltage of the COMM terminal by the microcomputer 24.

The embodiment described above is arranged to provide the connector 8 separate from the ECU 6, but the connector 8 may be mounted directly on the ECU 6.

Next, the activating apparatus of passive safety device according to the second embodiment of the present invention will be described by reference to FIG. 12 to FIG. 14. In the description of the activating apparatus of a passive safety device according to the second embodiment, the same components as those in the activating apparatus of the passive safety device according to the first embodiment will be explained by denoting them by the same reference symbols as used in the description of the first embodiment.

Figure 12:
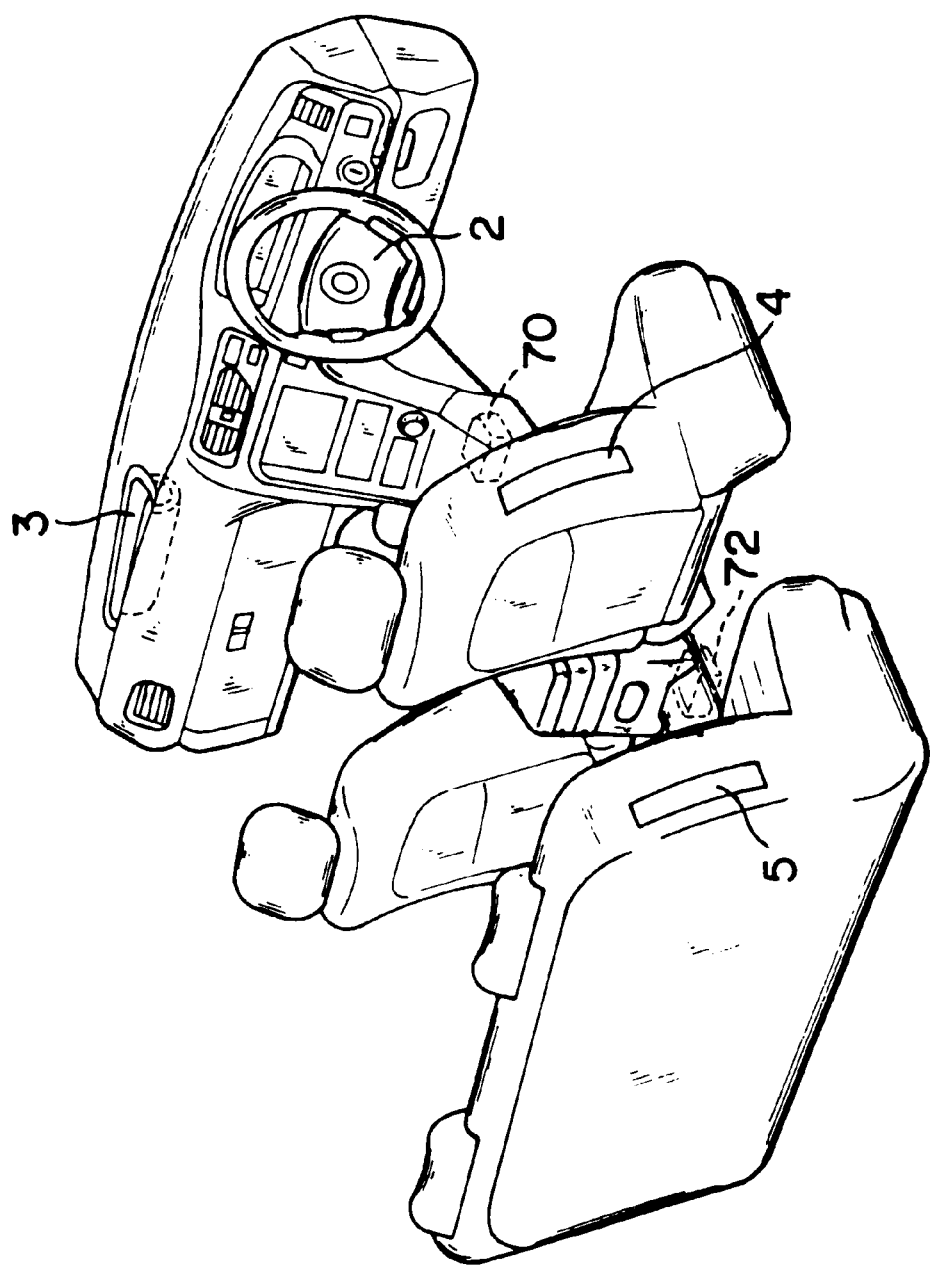
FIG. 12 is a drawing to show another arrangement of air bag devices inside a vehicle according to the second embodiment.

FIG. 12 is a drawing to show an arrangement of air bag devices inside a vehicle. Inside the vehicle there are the air bag device 2 for the driver seat, the air bag device 3 for the passenger seat, and the front side air bag device 4 installed, and also a rear side air bag device 5 placed. The driver air bag device 2, passenger air bag device 3, and front side air bag device 4 are arranged to have the squibs 2a, 3a, 4a (see FIG. 13) for activating each air bag device and a front ECU (electronic control unit) 70 for controlling the activation of the air bag devices. The rear side air bag device 5 is arranged to have a squib 5a (see FIG. 13) for activating the rear side air bag device 5 and a rear ECU (electronic control unit) 72 for controlling the activation of this air bag device.

Figure 13:
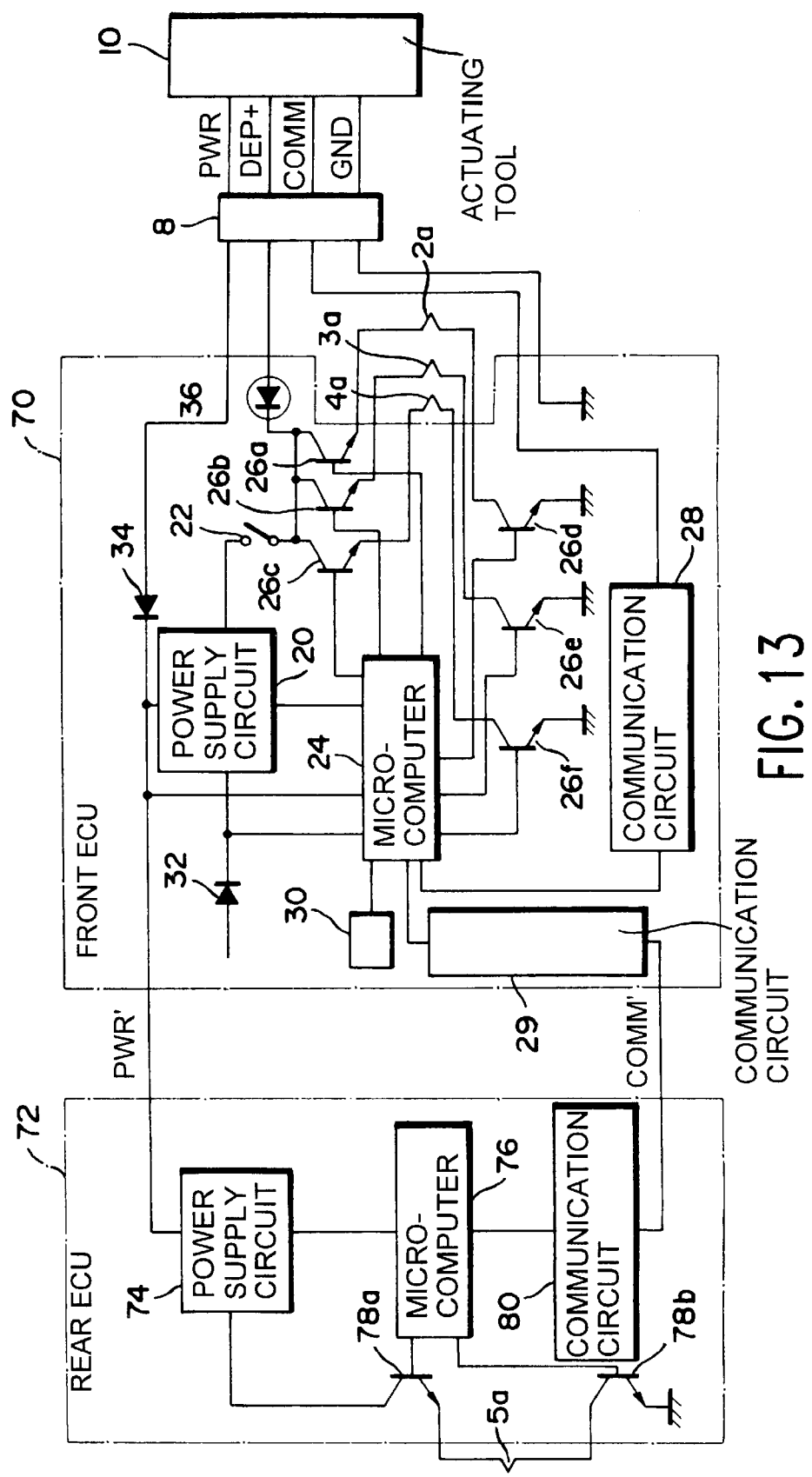
FIG. 13 is a diagram to show the structure of the activating apparatus of a passive safety device according to the second embodiment.
Figure 14:
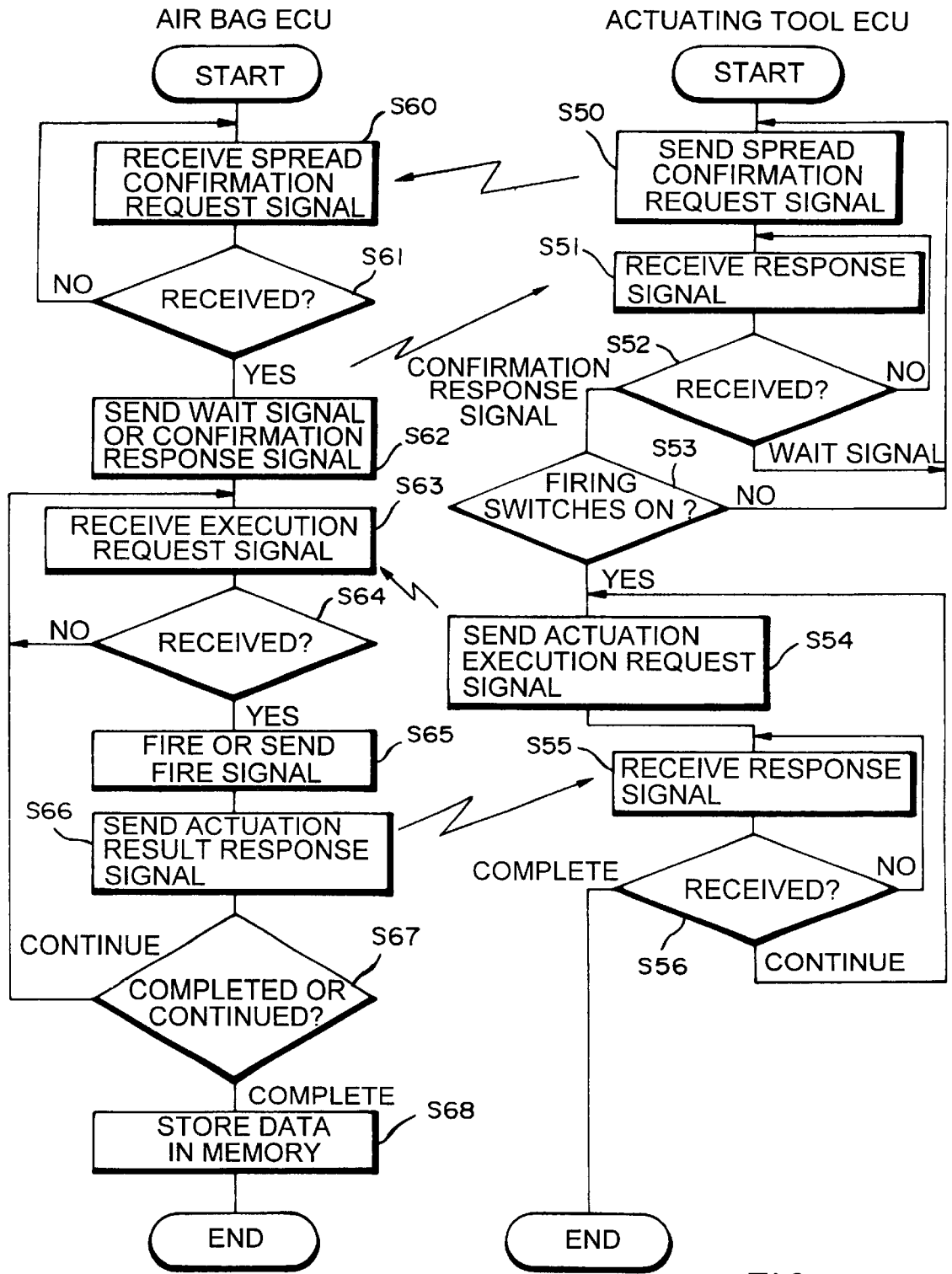
FIG. 14 is flowcharts of the forced activation process in the activating apparatus of a passive safety device according to the second embodiment.

FIG. 13 is a diagram to show the structure of the activating apparatus of air bag device for forcedly actuating the driver air bag device 2, passenger air bag device 3, front side air bag device 4, and rear side air bag device 5. This activating apparatus of the air bag device is composed of the front ECU 70 (first activation executing device), the rear ECU 72 (second activation executing device) connected to the front ECU 70, and the actuating tool 10 (activation instructing device) to be connected through the connector 8 (second connecting means) to the front ECU 70 at the time of forced actuation of the passive safety device.

The front ECU 70 is further provided with a communication circuit 29 for communication with the rear ECU 72, in addition to the configuration of the ECU 6 in the first embodiment. The rear ECU 72 is composed mainly of a power supply circuit 74, a microcomputer 76, firing transistors 78a, 78b, and a communication circuit 80.

Among the components of the rear ECU 72, the power supply circuit 74 is connected to the downstream side of the diode 34 of the front ECU 70. This power supply circuit 74 functions to produce a predetermined voltage to be applied to the squib 5a from the power supply voltage supplied from the front ECU 70 and apply the produced voltage to the squib 5a and also to produce a predetermined voltage to be applied to the microcomputer 76 and apply the produced voltage to the microcomputer 76. The microcomputer 76 functions to control on/off of the firing transistor 78a placed between the squib 5a and the power supply circuit 74 and to control on/off of the firing transistor 78b placed between the squib 5a and the ground (GND). Further, the communication circuit 80 is connected to the communication circuit 29 of the front ECU 70 by communication line CCOM' (first connecting means) and functions to control communication with the front ECU 70.

Next described is the forced activation of the air bag device by this activating apparatus of passive safety device. For carrying out the forced activation of the air bag device by the activating apparatus of passive safety device, the initialization process (see FIG. 5) is first carried out in the same manner as in the first embodiment.

Next described is the forced activation process of the air bag device carried out after completion of the initialization process. After completion of the above initialization process, the forced activation process of the air bag device shown in the flowchart of FIG. 14 is carried out in each of the microcomputer 50 of the actuating tool 10, the microcomputer 24 of the front ECU 70, and the microcomputer 76 of the rear ECU 72.

The microcomputer 50 of the actuating tool 10 first sends a spread confirmation request signal to the front ECU 70 through the communication interface 60 (step 50). The microcomputer 24 of the front ECU 70 is in a process for receiving the spread confirmation request signal while controlling the communication circuit 28 (step 60). The microcomputer 24 repeats the process of step 60 and step 61 before receiving the spread confirmation request signal. On the other hand, once the spread confirmation request signal is received (step 61), the microcomputer 24 sends a WAIT signal or a confirmation response signal (step 62).

When the front ECU 70 receives the spread confirmation request signal, it determines whether the current now supplied is one supplied from the actuating tool 10 or one supplied from a backup capacitor or the like, not illustrated, immediately after off of the on-vehicle power supply. While the ECU 70 cannot make a decision, it sends the WAIT signal. The ECU 70 sends the confirmation response signal when it can make a decision.

After having sent the spread confirmation request signal, the microcomputer 50 of the actuating tool 10 is in a process for receiving the WAIT signal or the confirmation response signal (step 51). The microcomputer 50 repeats the process of step 51 and step 52 before receiving either the WAIT signal or the confirmation response signal. On the other hand, when the WAIT signal or the confirmation response signal is received (step 52) and if it is the WAIT signal, the microcomputer 50 returns to the process of step 50 to send the spread confirmation request signal again (step 50).

When the signal received in the process of step 52 is the confirmation response signal, it is determined whether the firing switches 44, 45 are on (step 53). When the firing switches 44, 45 are off, the microcomputer 50 returns to the process of step 50 to send the spread confirmation request signal again (step 50) and repeats the process of step 50 to step 53 before the firing switches 44, 45 become on.

It is determined in step 53 whether the firing switches 44, 45 are turned on simultaneously. When the firing switches 44, 45 are determined to be turned on simultaneously, the transistors 56, 64 are turned on and the actuating tool 10 sends an actuation execution request signal to the ECU 70 (step 54).

After having sent the confirmation response signal, the microcomputer 24 of front ECU 70 is in a process for receiving an actuation execution request signal (step 63, step 64). When receiving the actuation execution request signal, the microcomputer 24 performs a process for activating an air bag device in the first group (step 65). In this process of step 65, the microcomputer 24 outputs an activation signal for activating the front side air bag device 4, to the front side air bag device 4 connected to the front ECU 70 out of the front side air bag device 4 and rear side air bag device 5 included in the first group.

Namely, the microcomputer 24 outputs the activation signal to the firing transistors 26c, 26f for firing the squib 4a of the front side air bag device 4 to turn the firing transistors 26c, 26f on. This causes the current to be supplied from the built-in secondary battery 52 of the actuating tool 10 to the squib 4a of the front side air bag device 4 through the DEP+ terminal, thereby accomplishing disposal of the front side air bag device 4.

As for the rear side air bag device 5 connected to the rear ECU 72 out of the front side air bag device 4 and rear side air bag 5 included in the first group, the microcomputer 24 sends the activation signal for activating this rear side air bag device 5 to the rear ECU 72 through the communication circuit 29.

When receiving the activation signal for activating the rear side air bag device 5 through the communication circuit 80, the microcomputer 76 of the rear ECU 72 outputs an activation signal for activating the rear side air bag device 5. Namely, the microcomputer 76 outputs the activation signal to the firing transistors 78a, 78b for firing the squib 5a of the rear side air bag device 5, thereby turning the firing transistors 78a, 78b on. This causes the current to be supplied from the power supply circuit 74 to the squib 5a, whereby the rear side air bag device 5 is forcedly activated, thus accomplishing disposal of the rear side air bag device 5. The disposal of the air bag devices included in the first group is completed by completion of disposal of the front side air bag device 4 etc. connected to the front ECU 70 and completion of disposal of the rear side air bag device 5 etc. connected to the rear ECU 72.

This activating apparatus of the air bag device separates the air bag devices to be forcedly activated into the first group including the front side air bag device 4 and the rear side air bag device 5 and the second group including the driver air bag device 2 and the passenger air bag device 3.

Then the microcomputer 24 of front ECU 70 sends an actuation result response signal to the actuating tool 10 (step 66). Specifically, the microcomputer 24 of front ECU 70 sends the actuation result response signal indicating "complete" through the communication circuit 28 when the forced activation of the all groups (the first group and second group) of the air bag devices to be forcedly activated is completed. When the forced activation of the all groups of the air bag devices to be forcedly activated is not completed yet, the microcomputer 24 sends the actuation result response signal indicating "continue" through the communication circuit 28.

When the actuation result response signal sent is the signal indicating "continue" (step 67), the microcomputer 24 of front ECU 70 returns to the process of step 63 to carry out the process for receiving the next actuation execution request signal (step 63, step 64).

After having sent the actuation execution request signal, the microcomputer 50 of the actuating tool 10 is in a process for receiving the actuation result response signal (step 55). The microcomputer 50 repeats the process of step 55 and step 56 before receiving the actuation result response signal. On the other hand, when the microcomputer 50 receives the actuation result response signal and when it is the actuation result response signal indicating "continue" (step 56), the microcomputer 50 returns to step 54 to send the actuation execution request signal again.

After having sent the actuation result response signal indicating "continue," the microcomputer 24 of front ECU 70 is in the process for receiving the actuation execution request signal (step 63, step 64). When receiving the actuation execution request signal, the microcomputer 24 outputs an activation signal for activating an air bag device in the second group. Specifically, the microcomputer 24 outputs the activation signal for activating the driver air bag device 2, passenger air bag device 3, etc. included in the second group to the firing transistors 26a, 26d, 26b, 26e, etc. for firing the squib 2a of the driver air bag device 2, the squib 3a of the passenger air bag device 3, and so on, thereby turning the firing transistors 26a, 26d, 26b, 26e, etc. on.

This causes the current to be supplied from the built-in secondary battery 52 of the actuating tool 10 to the squib 2a of the driver air bag device 2 and to the squib 3a of the passenger air bag device 3 through the DEP+ terminal and thus to forcedly activate the air bag devices, thereby accomplishing disposal of the driver air bag device 2, passenger air bag device 3, etc. included in the second group. The forced activation of the driver air bag device 2 is carried out last out of the air bag devices in the second group. Namely, the driver air bag device 2 is forcedly activated last a predetermined time after the forced activation of the air bag devices except for the driver air bag device 2, i.e., after the forced activation of the passenger air bag device 3 and the other devices, if any.

When the forced activation of the air bag devices of the second group is completed, the front ECU 70 sends the actuation result response signal indicating "complete" to the actuating tool 10 through the communication circuit 28 (step 66, step 67). Then step 68 is carried out to store in the memory 30 the fact that the forced activation of the air bag devices is completed, i.e., the fact that the disposal of the air bag devices is finished, and then the forced activation process of the air bag device in the front ECU 70 is terminated. On the other hand, when the signal received in the process of step 55 is the actuation result response signal indicating "complete" (step 56), the microcomputer 50 of the actuating tool 10 terminates the forced activation process of the air bag device in the actuating tool 10.

The activating apparatus of the air bag device according to the present embodiment can dispose of not only the air bag devices connected to the front ECU 70, but also the air bag device(s) connected to the rear ECU 72, by simply connecting the actuating tool 10 to the front ECU 70.

In the second embodiment described above, the circuits are grounded separately downstream of the firing transistors 26d, 26e, 26f provided in the front ECU 70 and downstream of the firing transistor 78b provided in the rear ECU 72; however, the circuits may be arranged so that the downstream side of the firing transistors 26d, 26e, 26f provided in the front ECU 70 is connected to the downstream side of the firing transistor 78b provided in the rear ECU 72 so as to keep them at an equipotential and to lead the connecting line to the ground.

The second embodiment described above is arranged to put the rear side air bag device 5 in the first group, but the apparatus may be arranged in such a configuration that the first group includes the air bag devices except for the driver air bag device 2 and passenger air bag device 3 out of those connected to the front ECU 70, the second group does the air bag device connected to the rear ECU 72, and the third group the driver air bag device 2 and passenger air bag device 3 and that the forced activation is carried out in order from the first group.

Further, if the number is great of the air bag devices except for the driver air bag device 2 and passenger air bag device 3 out of those connected to the front ECU 70, they can be separated into plural groups so that the forced activation can be carried out group by group.

Next described is the activating apparatus of a passive safety device according to the third embodiment of the present invention. In the description of the activating apparatus of the passive safety device according to the third embodiment, the same components as those in the activating apparatus of the passive safety device according to the second embodiment will be described by denoting them by the same reference symbols as those used in the description of the second embodiment.

Figure 15:
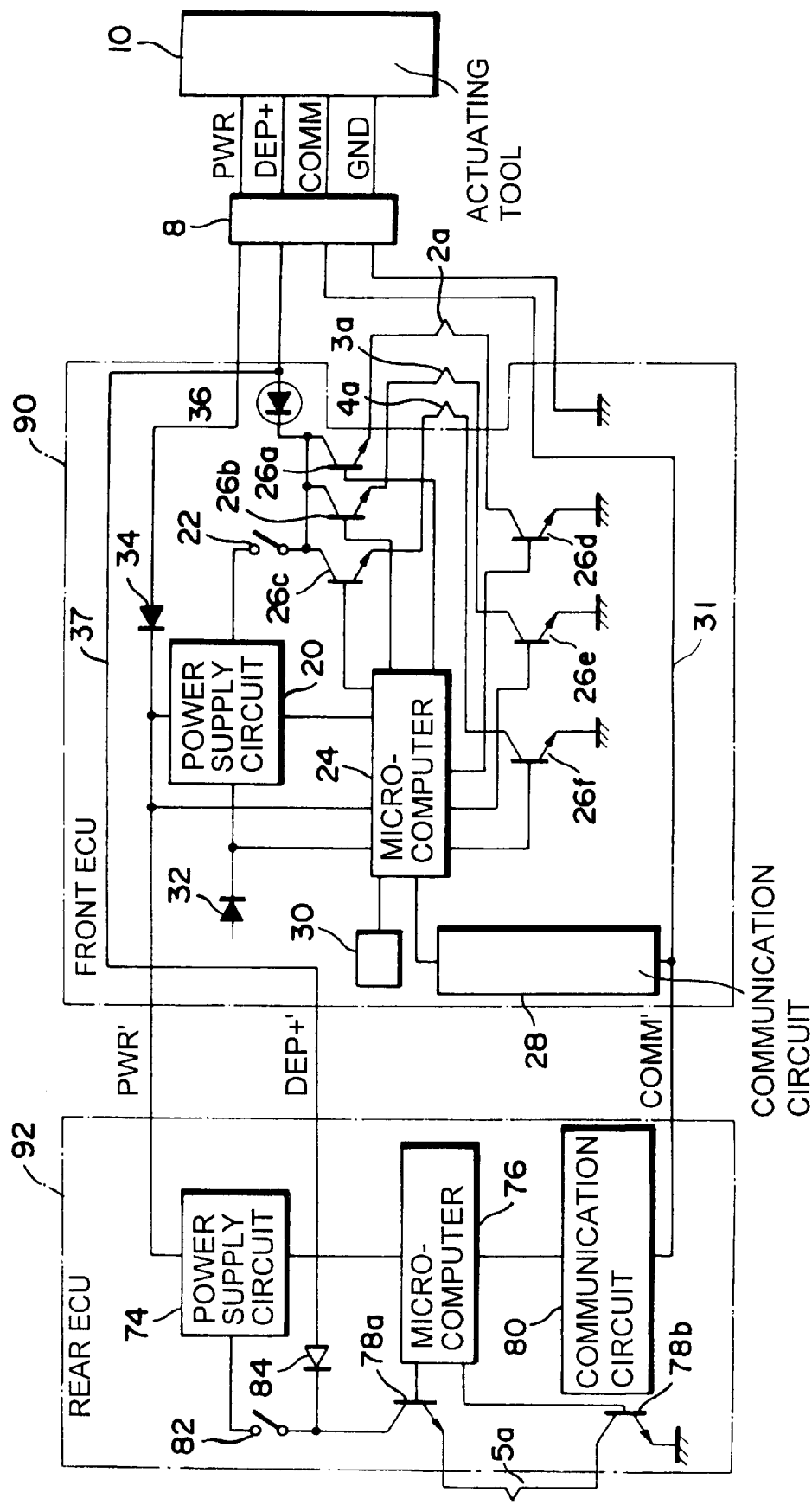
FIG. 15 is a diagram to show the structure of the activating apparatus of a passive safety device according to the third embodiment.

FIG. 15 is a diagram to show the structure of the activating apparatus of the passive safety device according to the third embodiment, which is an activating apparatus of an air bag device for forcedly activating the driver air bag device 2, passenger air bag device 3, front side air bag device 4, and rear side air bag device 5. This activating apparatus of the air bag device is composed of a front ECU 90 (first activation executing device), a rear ECU 92 (second activation executing device) connected to the front ECU 90, and the actuating tool 10 (activation instructing device) to be connected to the front ECU 90 through the connector 8 (second connecting means) at the time of forced actuation of the passive safety device.

The front ECU 90 has the structure attained by excluding the communication circuit 29 from the front ECU 70 in the second embodiment. A communication line 31 (COMM': first connecting means) is provided for directly connecting the COMM terminal of the connector 8 to the communication circuit 80 of the rear ECU 92. The rear ECU 92 has a safing sensor 82 between the power supply circuit 74 and the firing transistor 78a of the rear ECU 72 of the second embodiment. The apparatus also has a current supply line 37 connecting the upstream side of the bypass diode 36 of the front ECU 90 to the downstream side of the safing sensor 82 through diode 84.

In this activating apparatus of the air bag device, instructions are given through the actuating tool 10 as to either execution of forced activation of the air bag devices connected to the front ECU 90 or execution of forced activation of the air bag device connected to the rear ECU 92. Specifically, when the instruction of execution of forced activation of the air bag devices connected to the front ECU 90 is given through the actuating tool 10, the microcomputer 24 of the front ECU 90 outputs an activation signal for activating the front side air bag device 4, driver air bag device 2, and passenger air bag device 3. This results in forcedly activating the front side air bag device 4, driver air bag device 2, and passenger air bag device 3, thereby disposing of the front side air bag device 4, driver air bag device 2, and passenger air bag device 3.

On the other hand, when the instruction of execution of forced activation of the air bag device connected to the rear ECU 92 is given through the actuating tool 10, this instruction of forced activation is transmitted through the transmission line 31 and communication circuit 80 to the microcomputer 76 of the rear ECU 92. This causes the microcomputer 76 of the rear ECU 92 to output an activation signal for activating the rear side air bag device 5, whereby the rear side air bag device 5 is forcedly activated, thus disposing of the rear side air bag device 5.

The activating apparatus of the air bag device according to the present embodiment can dispose of not only the air bag devices connected to the front ECU 90, but also the air bag device connected to the rear ECU 92, according to the instruction from the actuating tool 10.

According to the present invention, at the time of disposal of the passive safety device the driving means disables outputting of a driving signal based on a crash of vehicle to the current controlling means. This prevents the current from being supplied from the on-vehicle power supply to the squib at the time of disposal of passive safety device, so that the current can be supplied from only the off-vehicle power supply to the squib. Therefore, the disposal of the passive safety device can be carried out with accuracy.

During the normal operation the driving means disables outputting of a driving signal based on the disposal of the passive safety device to the current controlling means. This prevents the current from being supplied from the off-vehicle power supply to the squib, so that the current can be supplied from only the on-vehicle power supply to the squib. Therefore, the operation of the passive safety devices can be performed with accuracy.

When the driving means outputs the driving signal to the current controlling means at the time of disposal of the passive safety device, the diagnosis of the driving means is carried out preliminarily. Therefore, outputting of the driving signal to the current controlling means can be executed surely. When the signal sent from the signal sending means is determined to be a predetermined signal differing every disposal of the passive safety device, the driving means outputs the driving signal to the current controlling means. Therefore, the driving signal can be outputted only if the predetermined signal is discriminated.

When the driving means outputs the driving signal to the current controlling means to supply the current from the off-vehicle power supply to the squib and to activate the passive safety device, the memory means stores the fact of execution of activation of the passive safety device. Therefore, the fact that the activation of the passive safety device was executed can be known by referencing the memory contents.

In disposal of plural passive safety devices, the driving means activates the driver passive safety device last out of the plural passive safety devices. Therefore, if an anomaly occurs on the way of successive activation of the plural passive safety devices, the activation of the passive safety device can be suspended before activation of the driver passive safety device the inflation amount of which is large. In the configuration wherein the second activation executing device is connected to the first activation executing device and where the activation instructing device is connected to the first activation executing device at the time of disposal of the passive safety device, the apparatus can dispose of not only the passive safety devices connected to the first activation executing device, but also the passive safety devices connected to the second activation executing device, by simply giving the instruction of activation of passive safety device from the activation instructing device to the first activation executing device.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An activating apparatus of a passive safety device provided on a vehicle, comprising:

a squib that, upon receiving an electric current, activates a passive safety device for protecting a passenger;

current controlling means for controlling the electric current supplied from a power supply to said squib when receiving a driving signal; and driving means for transmitting the driving signal to said current controlling means in the event of a crash of the vehicle and at the time of disposal of said passive safety device, said power supply being an on-vehicle power supply in the event of a crash of the vehicle, and said power supply being an off-vehicle power supply at the time of disposal of said passive safety device, wherein, at the time of disposal of said passive safety device, said driving means disables transmission of the driving signal based on the crash of the vehicle to said current controlling means.

2. An activating apparatus of passive safety device according to claim 1, wherein said driving means makes determination that the disposal of said passive safety device is under way, if a voltage of said off-vehicle power supply connected at the time of disposal of said passive safety device is not less than a predetermined voltage value.

3. An activating apparatus of passive safety device according to claim 1, wherein said driving means makes determination that the disposal of said passive safety device is under way, if a voltage of said off-vehicle power supply connected at the time of disposal of said passive safety device is not less than a predetermined voltage value and if a voltage of said on-vehicle power supply is not more than a predetermined voltage value.

4. An activating apparatus of a passive safety device provided on a vehicle, comprising:
   a squib that, upon receiving an electric current, activates a passive safety device for protecting a passenger;
   current controlling means for controlling the electric current supplied from a power supply to said squib when receiving a driving signal; and
   driving means for transmitting the driving signal to said current controlling means in the event of a crash of the vehicle and at the time of disposal of said passive safety device, said power supply being an on-vehicle power supply in the event of a crash of the vehicle, and said power supply being an off-vehicle power supply at the time of disposal of said passive safety device,
   wherein said driving means disables transmission of the driving signal based on the disposal of said passive safety device to said current controlling means during normal operation.

5. An activating apparatus of passive safety device according to claim 4, wherein said driving means makes determination that said normal operation is under way, if a voltage of said off-vehicle power supply connected at the time of disposal of said passive safety device is not more than a predetermined voltage value.

6. An activating apparatus of passive safety device according to claim 4, wherein said driving means makes determination that said normal operation is under way, if a voltage of said off-vehicle power supply connected at the time of disposal of said passive safety device is not more than a predetermined voltage value and if a voltage of said on-vehicle power supply is not less than a predetermined voltage value.

7. An activating apparatus of a passive safety device provided on a vehicle, comprising:
   a squib that, upon receiving an electric current, activates a passive safety device for protecting a passenger;
   current controlling means for controlling the electric current supplied from a power supply to said squib when receiving a driving signal; and
   driving means for transmitting the driving signal to said current controlling means in the event of a crash of the vehicle and at the time of disposal of said passive safety device, said power supply being an on-vehicle power supply in the event of a crash of the vehicle, and said power supply being an off-vehicle power supply at the time of disposal of said passive safety device,
   wherein before said driving means transmits the driving signal to said current controlling means at the time of disposal of said passive safety device, a diagnosis of said driving means is carried out.

8. An activating apparatus of passive safety device according to claim 7, wherein when said driving means outputs the driving signal to said current controlling means at the time of disposal of said passive safety device, a diagnosis of operation of said current controlling means is disabled.

9. An activating apparatus of passive safety device according to claim 8, wherein said driving means makes determination that the disposal of said passive safety device is under way, if a voltage of said off-vehicle power supply connected at the time of disposal of said passive safety device is not less than a predetermined voltage value.

10. An activating apparatus of passive safety device according to claim 8, wherein said driving means makes determination that the disposal of said passive safety device is under way, if a voltage of said on-vehicle power supply is not more than a predetermined voltage value.

11. An activating apparatus of passive safety device according to claim 8, wherein said driving means makes determination that the disposal of said passive safety device is under way, if a voltage of said off-vehicle power supply connected at the time of disposal of said passive safety device is not less than a predetermined voltage value and if a voltage of said on-vehicle power supply is not more than a predetermined voltage value.

12. An activating apparatus of a passive safety device provided on a vehicle, comprising:
    a squib that, upon receiving an electric current, activates a passive safety device for protecting a passenger;
    Current controlling means for controlling the electric current supplied from a power supply to said squib when receiving a driving signal; and
    driving means for transmitting the driving signal to said current controlling means in the event of a crash of the vehicle and at the time of disposal of said passive safety device, said power supply being an on-vehicle power supply in the event of a crash of the vehicle, and said power supply being an off-vehicle power supply at the time of disposal of said passive safety device,
    wherein said activating apparatus further comprises signal sending means for sending a signal to said driving means in a state in which said off-vehicle power supply is connected, and
    wherein when a signal sent out from said signal sending means is determined to be a predetermined signal differing every disposal of said passive safety device, said driving means outputs the driving signal to said current controlling means.

13. An activating apparatus of a passive safety device provided on a vehicle, comprising:
    a squib that, upon receiving an electric current, activates a passive safety device for protecting a passenger;
    current controlling means for controlling the electric current supplied from a power supply to said squib when receiving a driving signal; and
    driving means for transmitting the driving signal to said current controlling means in the event of a crash of the vehicle and at the time of disposal of said passive safety device, said power supply being an on-vehicle power supply in the event of a crash of the vehicle, and said power supply being an off-vehicle power supply at the time of disposal of said passive safety device,
    wherein said activating apparatus further comprises memory means for storing a fact that said driving means transmitted the driving signal to current controlling means so as to supply the electric current from said off-vehicle power supply to said squib, thereby activating said passive safety device.

14. An activating apparatus of a passive safety device provided on a vehicle, comprising an activation executing device for carrying out activation of a passive safety device, and an activation instructing device connected to said activation executing device at a time of disposal of said passive safety device, said activation instructing device giving an instruction to activate said passive safety device to said activation executing device and supplying an electric current from an off-vehicle power supply to said activation device, said activation executing device comprising:

a squib that, upon receiving an electric current, activates a passive safety device for protecting a passenger;

current controlling means for controlling the electric current supplied from a power supply to said squib when receiving a driving signal; and driving means for transmitting the driving signal to said current controlling means in the event of a crash of the vehicle and at the time of disposal of said passive safety device, said power supply being an on-vehicle power supply in the event of a crash of the vehicle, and said power supply being an off-vehicle power supply at the time of disposal of said passive safety device, wherein when said activation instructing device gives the instruction of activation of said passive safety device, said driving means disables transmission of the driving signal based on the crash of the vehicle to said current controlling means.

15. An activating apparatus of passive safety device according to claim 14, further comprising memory means for storing a fact that said driving means outputted the driving signal to said current controlling means so as to supply the electric current from said off-vehicle power supply to said squib, thereby activating said passive safety device.

16. An activating apparatus of passive safety device according to claim 15, wherein said memory means is provided in said activation executing device.

17. An activating apparatus of passive safety device according to claim 15, wherein said memory means is provided in said activation instructing device.

18. An activating apparatus of passive safety device according to claim 15, wherein said memory means further stores a fact of completion of the disposal of the passive safety device.

19. An activating apparatus of passive safety device according to claim 15, wherein said memory means further stores a number of passive safety devices which have been disposed of.

20. An activating apparatus of passive safety device according to claim 15, wherein said memory means further stores a type of the vehicle the passive safety device of which has been disposed of.

21. An activating apparatus of passive safety device according to claim 15, wherein said memory means further stores a frame number of the vehicle the passive safety device of which has been disposed of.

22. An activating apparatus of a passive safety device provided on a vehicle, comprising:

a squib that, upon receiving an electric current, activates a passive safety device for protecting a passenger;

current controlling means for controlling the electric current supplied from a power supply to said squib when receiving a driving signal; and driving means for transmitting the driving signal to said current controlling means in the event of a crash of the vehicle and at the time of disposal of said passive safety device, said power supply being an on-vehicle power supply in the event of a crash of the vehicle, and said power supply being an off-vehicle power supply at the time of disposal of said passive safety device, wherein at the time of disposal of a plurality of passive safety devices, said driving means activates a passive safety device for a driver's seat last out of said passive safety devices.

23. An activating apparatus of passive safety device comprising a first activation executing device and a second activation executing device each for executing activation of a passive safety device, first connecting means for electrically connecting said first activation executing device to said second activation executing device, and second connecting means for electrically connecting an activation instructing device for giving an instruction of activation of said passive safety device, to said first activation executing device, wherein when said activation instructing device gives the instruction of activation of said passive safety device through said second connecting means, the activating apparatus is arranged to operate in such a way that, for executing activation of said passive safety device connected to said first activation executing device, an activation signal is outputted to at least one said passive safety device connected to said first activation executing device, and that, for executing activation of said passive safety device connected to said second activation executing device, an activation signal is outputted to said second activation executing device through said first connecting means, and then an activation signal is outputted to at least one said passive safety device connected to said second activation executing device.

* * * * *